(12) United States Patent
Wang et al.

(10) Patent No.: US 11,816,117 B2
(45) Date of Patent: Nov. 14, 2023

(54) DATA RETRIEVAL METHOD AND APPARATUS

(71) Applicant: Huawei Technologies Co., Ltd., Shenzhen (CN)

(72) Inventors: Zheng Wang, Hangzhou (CN); Zhangyun Zhao, Shenzhen (CN); Rongrong Fu, Hangzhou (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/190,188

(22) Filed: Mar. 2, 2021

(65) Prior Publication Data

US 2021/0182318 A1 Jun. 17, 2021

Related U.S. Application Data

(63) Continuation of application No. PCT/CN2019/085483, filed on May 5, 2019.

(30) Foreign Application Priority Data

Sep. 4, 2018 (CN) .......................... 201811024553.5
Nov. 2, 2018 (CN) .......................... 201811298840.5

(51) Int. Cl.
*G06F 16/22* (2019.01)
*G06F 16/2458* (2019.01)
(Continued)

(52) U.S. Cl.
CPC .......... *G06F 16/2468* (2019.01); *G06F 16/22* (2019.01); *G06F 16/285* (2019.01); *G06V 10/761* (2022.01); *G06V 20/54* (2022.01)

(58) Field of Classification Search
CPC .... G06F 16/285; G06F 16/22; G06F 16/2477; G06F 16/2468; G06F 18/2134;
(Continued)

(56) References Cited

U.S. PATENT DOCUMENTS

2004/0093333 A1 5/2004 Suzuki et al.
2005/0228788 A1 10/2005 Dahn et al.
(Continued)

FOREIGN PATENT DOCUMENTS

CN 101339550 A 1/2009
CN 103049514 A 4/2013
(Continued)

OTHER PUBLICATIONS

Liu et al., Quick Searching Based on L-K Means Hierarchical Clustering in a Huge Scale Face Database, 2008, IEEE, pp. 42-47 (Year: 2008).*

(Continued)

*Primary Examiner* — Jorge A Casanova
(74) *Attorney, Agent, or Firm* — Conley Rose, P.C.

(57) ABSTRACT

In a data preparation process, raw data in a database is classified into first-type data and second-type data. In a data retrieval process, a first retrieval range is determined in the first-type data, and to-be-retrieved data is retrieved in the first retrieval range, to obtain a first retrieval result; the to-be-retrieved data is retrieved from all of the second-type data, to obtain a second retrieval result; and finally, a final retrieval result is determined from the first retrieval result and the second retrieval result.

20 Claims, 7 Drawing Sheets

(51) Int. Cl.
  *G06F 16/28* (2019.01)
  *G06V 10/74* (2022.01)
  *G06V 20/54* (2022.01)

(58) Field of Classification Search
  CPC .......... G06F 18/22; G06F 16/53; G06F 16/55; G06F 18/23213; G06F 18/23; G06V 10/761; G06V 20/54
  USPC ........ 707/609, 687, 705, 769, 790, 813, 821
  See application file for complete search history.

(56) References Cited

U.S. PATENT DOCUMENTS

| | | | |
|---|---|---|---|
| 2006/0204058 A1* | 9/2006 | Kim | G06V 40/172 382/118 |
| 2010/0036830 A1 | 2/2010 | Lee | |
| 2013/0054603 A1* | 2/2013 | Birdwell | G06K 9/6224 707/738 |
| 2015/0149879 A1* | 5/2015 | Miller | G06F 16/2477 715/226 |
| 2017/0213127 A1* | 7/2017 | Duncan | G16B 50/30 |
| 2018/0253626 A1* | 9/2018 | Lin | G06V 20/80 |
| 2019/0026189 A1 | 1/2019 | Kim | |

FOREIGN PATENT DOCUMENTS

| | | |
|---|---|---|
| CN | 104636468 A | 5/2015 |
| CN | 105007464 A | 10/2015 |
| CN | 106557493 A | 4/2017 |
| CN | 107203554 A | 9/2017 |
| CN | 107274070 A | 10/2017 |
| CN | 107657062 A | 2/2018 |
| CN | 107704601 A | 2/2018 |
| KR | 101663547 B1 | 10/2016 |

OTHER PUBLICATIONS

Yandex, A., et al. "Efficient Indexing of Billion-Scale datasets of deep descriptors" published in: 2016 IEEE Conference on Computer Vision and Pattern Recognition (CVPR),Electronic ISSN: 1063-6919, INSPEC Accession No. 16541335, Las Vegas, NV, USA, 9 pages.

Babenko, A., et al. "The Inverted Multi-Index", in IEEE Transactions on Pattern Analysis and Machine Intelligence, vol. 37, No. 6, Jun. 2015, 14 pages.

Wang Xinjian et al., "Image retrival method based on SVM and active learning," Application Research of Computer, vol. 33, No. 12, Dec. 2016, with an English abstract, 4 pages.

Liu Xiao-hua et al., "Method of a quick searching in a huge scale face database," Journal of Jilin University (Engineering and Technology Edition), vol. 40, No. 1, Jan. 2010, with an English abstract, 17 pages.

M Alarmel Mangai et al., "View-Based Clustering and Content-Based Retrieval of 3-D objects from their appearances," 2010 IEEE, 5 pages.

* cited by examiner

DATA RETRIEVAL METHOD AND APPARATUS

CROSS-REFERENCE TO RELATED APPLICATIONS

This is a continuation of Int'l Patent App. No. PCT/CN2019/085483, filed on May 5, 2019, which claims priority to Chinese Patent App. No. 201811298840.5, filed on Nov. 2, 2018 and Chinese Patent App. No. 201811024553.5, filed on Sep. 4, 2018, all of which are incorporated by reference.

FIELD

This disclosure relates to the computer field, and in particular, to a data retrieval method and apparatus.

BACKGROUND

With the development of computer technologies, an image-based retrieval method is applied to increasingly more fields. For example, a public security system can identify a criminal by comparing human image data collected in real time with data in a database. A traffic system can accurately locate a vehicle driving track by using vehicle license plate information collected in real time, to search for a hit-and-run vehicle. In the foregoing disclosure scenarios, a large amount of data is stored in a database, and an amount of data that needs to be compared during retrieval increases with an increasing amount of collected data. This poses a great challenge to an image retrieval speed and image retrieval precision. How to provide a method that can ensure image retrieval precision and increase an image retrieval speed becomes a problem that needs to be urgently resolved in the image retrieval field.

SUMMARY

This disclosure provides a data retrieval method and apparatus, to ensure a retrieval speed and improve retrieval precision.

According to a first aspect, a data retrieval method is provided. The method includes: classifying N pieces of data in a database into first-type data and second-type data, where $N \geq 2$; determining a first retrieval range in the first-type data, and retrieving to-be-retrieved data in the first retrieval range, to obtain a first retrieval result, where data in the first retrieval range is a subset of the first-type data; retrieving the to-be-retrieved data in an entire range of the second-type data, to obtain a second retrieval result; and determining a final retrieval result of the to-be-retrieved data from the first retrieval result and the second retrieval result. Specifically, a Euclidean distance between the to-be-retrieved data and each piece of data in the first retrieval range of the first-type data is calculated, and data at a shortest distance to the to-be-retrieved data is determined as the first retrieval result; a Euclidean distance between the to-be-retrieved data and each piece of second-type data is calculated, and data at a shortest distance to the to-be-retrieved data is determined as the second retrieval result; and then, a retrieval result at a shortest Euclidean distance to the to-be-retrieved data is selected as the final retrieval result. According to the description of the foregoing process, the data in the original database is classified into the first-type data and the second-type data, where the first-type data is data that affects retrieval precision, and the second-type data is data that affects a retrieval speed; retrieval in a narrowed retrieval range is performed in the first-type data, and brute-force retrieval is performed in the second-type data; and the final retrieval result is obtained based on the retrieval results of the two types of data. In this way, both retrieval precision and a retrieval speed are ensured.

In a possible implementation, the N pieces of data are grouped into M clusters according to a clustering algorithm, where each piece of data corresponds to one cluster, each cluster has one central point, each piece of data has a high similarity to a central point of a cluster to which the data belongs, $M \geq 2$, and a cluster index of each cluster is used to uniquely identify the cluster. In this case, the second-type data is a set of data at edge points of all the clusters, and the first-type data is a set of data other than the second-type data in the original database. According to the foregoing description, the raw data may be classified into the two types of data, to further identify the second-type data that affects retrieval precision.

Optionally, the second-type data is the set of data at the edge points of all the clusters. An edge point is data that includes data of two or more clusters in a range with the edge point as a center and a first threshold as a radius. The first-type data is the data other than the second-type data in the original database.

In another possible implementation, the first-type data may be further divided into a plurality of layers according to a preset algorithm, where each layer includes at least one piece of first-type data, each piece of first-type data belongs to one layer, and a layer index of each layer is used to uniquely identify the layer. According to the foregoing description, the first-type data is divided into the plurality of layers, and during data retrieval, a retrieval range may be selected with reference to clustering and layer division of the first-type data, to implement retrieval in a narrowed retrieval range in the first-type data. This reduces retrieval duration, and improves retrieval efficiency.

In another possible implementation, the classifying N pieces of data into first-type data and second-type data includes: selecting a comparison cluster from the M clusters; selecting z pieces of reference data from the N pieces of data, where $1 \leq z \leq N$; and performing the following data classification processing for each piece of reference data: obtaining to-be-classified data through retrieval from the database based on current reference data, where the to-be-classified data is data that has a high similarity to the current reference data; and determining whether the to-be-classified data belongs to the comparison cluster, and if the to-be-classified data belongs to the comparison cluster, classifying the to-be-classified data as the first-type data, or if the to-be-classified data does not belong to the comparison cluster, classifying the to-be-classified data as the second-type data. According to the description of the foregoing data classification processing process, the raw data may be classified as a combination of first-type data and second-type data, and different retrieval manners may be used for data retrieval in different types of data. This ensures retrieval precision, and increases a retrieval speed.

In another possible implementation, the obtaining to-be-classified data through retrieval from the database, where the to-be-classified data is data that has a high similarity to the current reference data includes: calculating similarities between the current reference data and the other $N-1$ pieces of data, performing sorting based on the calculated similarities to obtain m pieces of data sorted in descending order of similarities to the current reference data, and using the m pieces of data as the to-be-classified data, where $1 \leq m \leq N-1$;

or calculating similarities between the current reference data and central points of the M clusters, determining m clusters sorted in descending order of similarities to the current reference data, and using data in the m clusters as the to-be-classified data, where 1≤m≤N−1. According to the foregoing method, in a round of data classification processing, the data in the original database may be classified into the first-type data and the second-type data; then, the first-type data is divided into the plurality of layers based on the combination of first-type data and second-type data; and finally, the to-be-retrieved data is retrieved in the first-type data in a manner of using a narrowed retrieval range. This reduces retrieval duration, and improves retrieval efficiency.

In another possible implementation, the selecting z pieces of reference data from the N pieces of data includes: when z=N, selecting each of the N pieces of data as the current reference data.

In another possible implementation, after a round of data classification processing is completed by using each of the z pieces of data as the current reference data, a next round of data classification processing is performed by using each of the z pieces of data as reference data again. A same comparison cluster is selected in all rounds of data classification processing, a quantity of comparison clusters selected in a current round of data classification processing is greater than a quantity of comparison clusters selected in a previous round of data classification processing, a comparison cluster selected in the previous round of data classification processing is a subset of comparison clusters selected in the current round of data classification processing, and when a quantity of comparison clusters reaches a preset maximum value, data classification processing ends. Through the plurality of rounds of data classification processing, a plurality of combinations of first-type data and second-type data are obtained, and the first-type data may be further divided into different layers with reference to the plurality of combinations of first-type data and second-type data. During data retrieval, a retrieval range of the first-type data is determined with reference to a layer index and a cluster index, to perform retrieval in a narrowed retrieval range. This reduces retrieval duration, and improves retrieval efficiency.

In another possible implementation, in each round of data classification processing, if the $P^{th}$ piece of data, as the to-be-classified data, is classified as the second-type data, the $P^{th}$ piece of data no longer participates as the to-be-classified data in data classification processing subsequent to the current round. The $P^{th}$ piece of data is any one of the N pieces of data. To improve data classification efficiency in a data preparation phase, when a piece of data is determined as second-type data, the piece of data is identified as the second-type data in a current round of data classification processing, and does not need to participate in a processing process subsequent to the current round of data processing. This reduces a calculation amount and duration of data classification processing.

In another possible implementation, a classification result is obtained in each round of data classification processing. The $X^{th}$ classification result in the $X^{th}$ round of data classification processing is a final classification result, and the $X^{th}$ round of data classification processing is the last round of data classification processing. First-type data obtained in the last round of data classification processing is divided into layers. First-type data at the first layer is first-type data obtained in the first round of data classification processing. First-type data at the $j^{th}$ layer=first-type data obtained in the $j^{th}$ round of data classification processing−first-type data obtained in the $(j-1)^{th}$ round of data classification processing, where 2≤j≤X.

In another possible implementation, a cluster index and a layer index are configured for each of the N pieces of data based on a clustering result and a layer division result of the data.

In another possible implementation, the first-type data has a cluster index and a layer index, and indication information of the first retrieval range is preset, where the indication information is used to indicate a cluster and a layer that are included in the first retrieval range; and a cluster index of the cluster included in the first retrieval range and a layer index of the layer included in the first retrieval range are determined based on the to-be-retrieved data and the indication information.

In another possible implementation, one or more pieces of first-type data that are in A clusters and whose layer indexes belong to B layers are selected from the first-type data as the first retrieval range, where 1≤A≤a, 1≤B≤b, a is a total quantity of clusters obtained through grouping in the database, b is a total quantity of layers into which the first-type data is divided, a≥1, b≥1, and a, b, A, and B are all positive integers.

In another possible implementation, one or more pieces of first-type data that are in C clusters and whose layer indexes belong to B layers are selected from the first-type data as the first retrieval range, where C=A+a first offset value, the first offset value ≥1, 1≤A≤a, 1≤B≤b, a is a total quantity of clusters obtained through grouping in the database, b is a total quantity of layers into which the first-type data is divided, a≥1, b≥1, and a, b, A, B, and C are all positive integers.

In another possible implementation, one or more pieces of first-type data that are in A clusters and whose layer indexes belong to D layers are selected from the first-type data as the first retrieval range, where D=B+a second offset value, the second offset value is a positive integer greater than or equal to 1, 1≤A≤a, 1≤B≤b, a is a total quantity of clusters obtained through grouping in the database, b is a total quantity of layers into which the first-type data is divided, a≥1, b≥1, and a, b, A, B, and D are all positive integers.

In another possible implementation, one or more pieces of first-type data that are in the $E^{th}$ cluster and whose layer indexes belong to the $F^{th}$ layer are selected from the first-type data as the first retrieval range, where E=A+a first offset value, F=B+a second offset value, the first offset value ≥1, the second offset value ≥1, both the first offset value and the second offset value are positive integers, 1≤A≤a, 1≤B≤b, a is a total quantity of clusters obtained through grouping in the database, b is a total quantity of layers into which the first-type data is divided, a≥1, b≥1, and a, b, A, B, E, and F are all positive integers.

In another possible implementation, before the first round of retrieval processing is performed, a to-be-retrieved image is received, and then characteristic information of the to-be-retrieved image is extracted as the to-be-retrieved data.

Based on the foregoing description, in a data preparation process, the data in the database is classified into the first-type data that affects a retrieval speed and the second-type data that affects retrieval precision, and then the first-type data is divided into the plurality of layers; in a subsequent data retrieval process, retrieval in the second-type data is performed in a brute-force retrieval manner, to ensure retrieval precision, and retrieval in the first-type data is performed in a narrowed retrieval range, to ensure a retrieval speed. Data that affects retrieval precision is mainly data that has a relatively low similarity to other data in the database and that directly affects the retrieval precision. Data that affects a retrieval speed is data that directly affects the retrieval speed, this part of data indirectly affects retrieval precision, and an amount of data selected from this part of data affects the retrieval speed. The raw data is classified into the first-type data and the second-type data, and different retrieval methods are used for the first-type data and the second-type data. A combination of the methods for the two types of data ensures precision and a speed of an entire retrieval process, reduces time consumption of the retrieval process, and improves efficiency of the retrieval process.

According to a second aspect, this disclosure provides a data retrieval apparatus, where the retrieval apparatus includes modules configured to perform the data retrieval method in any one of the first aspect or the possible implementations of the first aspect.

According to a third aspect, this disclosure provides a data retrieval apparatus, where the apparatus includes a processor, a memory, a communications interface, and a bus. The processor, the memory, and the communications interface are connected to and communicate with each other by using the bus. The memory is configured to store program code, and when the apparatus runs, the processor executes the program code in the memory, to perform the operation steps of the method in any one of the first aspect or the possible implementations of the first aspect by using a hardware resource in the apparatus.

According to a fourth aspect, this disclosure provides a heterogeneous apparatus system for data retrieval, where the heterogeneous apparatus system includes a first apparatus and a second apparatus. The first apparatus and the second apparatus communicate with each other by using a network, and the second apparatus is configured to assist the first apparatus in performing data retrieval processing. The first apparatus includes a first processor, a memory, a communications interface, and a bus. The first processor, the memory, and the communications interface are connected to and communicate with each other by using the bus. The memory is configured to store program code. The second apparatus includes a first processor, a second processor, a memory, a communications interface, and a bus. The first processor, the second processor, the memory, and the communications interface are connected to and communicate with each other by using the bus. The memory is configured to store program code. When the first apparatus runs, the first processor is configured to: execute the program code in the memory of the first apparatus, and send to-be-retrieved data to the second apparatus. After receiving the to-be-retrieved data, the first processor of the second apparatus executes, by using the second processor, the program code in the second apparatus to complete retrieval of the to-be-retrieved data, and sends a result to the first processor of the first apparatus. The first processor in each of the first apparatus and the second apparatus is a central processing unit (CPU), a digital signal processor (DSP), an application-specific integrated circuit (ASIC), a field-programmable gate array (FPGA) or another programmable logic device, a discrete gate or a transistor logic device, a discrete hardware component, or the like. The second processor is a graphics processing unit (GPU) or a neural processing unit (NPU).

Optionally, when the second processor is a GPU, the second apparatus further includes a video RAM.

According to a fifth aspect, this disclosure provides a computer readable storage medium. The computer readable storage medium stores an instruction, and when the instruction is run on a computer, the computer is enabled to perform the method in any one of the first aspect or the possible implementations of the foregoing aspects.

According to a sixth aspect, this disclosure provides a computer program product including an instruction. When the computer program product is run on a computer, the computer is enabled to perform the method in the foregoing aspects.

Based on the implementations provided in any one of the first aspect or the possible implements of the foregoing aspects, this disclosure can further combine the implementations to provide more implementations.

DETAILED DESCRIPTION

The following clearly describes the technical solutions in the embodiments of this disclosure with reference to the accompanying drawings in the embodiments of this disclosure.

Figure 1:
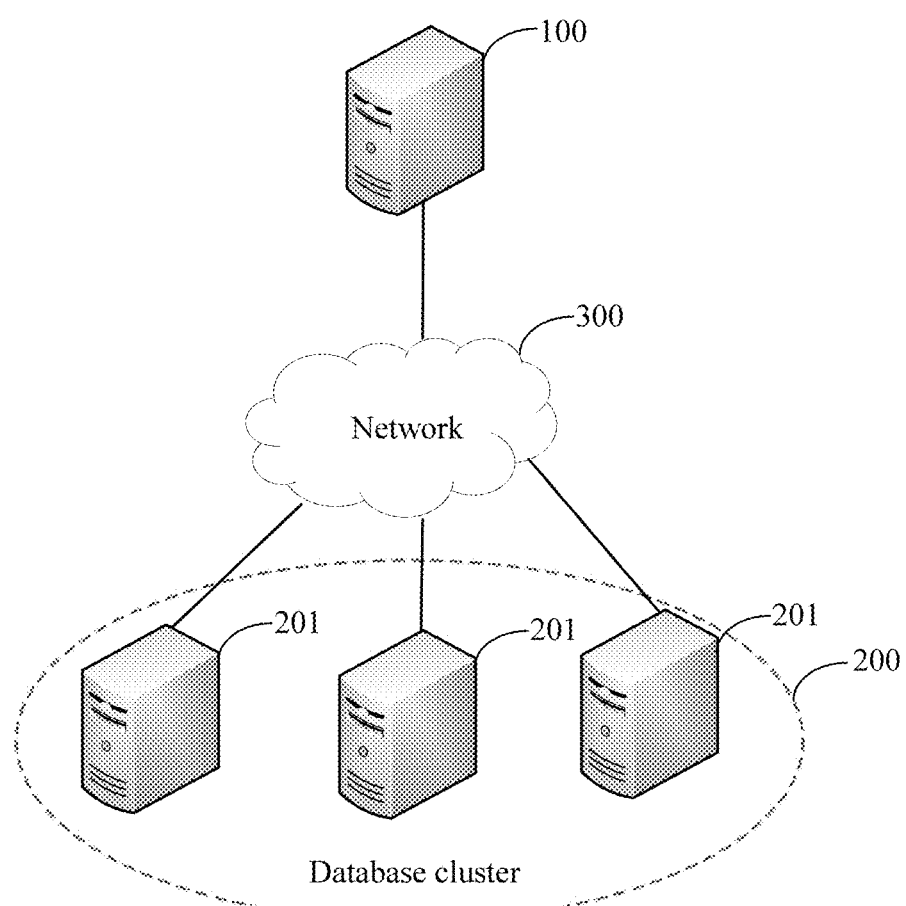
FIG. 1 is a schematic diagram of an architecture of a data retrieval system according to this disclosure.

FIG. 1 is a schematic diagram of an architecture of a retrieval system according to an embodiment of this disclosure. As shown in the figure, the retrieval system includes a retrieval server 100 and a database cluster 200. The retrieval server 100 and the database cluster 200 communicate with each other by using a network 300. The retrieval server 100 is configured to: receive a retrieval task, and search the database cluster 200 for matched data. The system architecture shown in FIG. 1 may include one or more retrieval servers 100, and an example in which the retrieval system includes only one retrieval server 100 is used in FIG. 1 for description. The database cluster 200 includes at least one database server 201. Database disclosures may be deployed in a distributed manner, or each server is deployed with a different type of database disclosure based on a service requirement, and stores different data.

A plurality of pieces of data are stored in a database, and the data stored in the database may also be referred to as raw data. An image is stored in the database, and characteristic information of each image may be extracted according to a preset rule. Each image includes a plurality of pieces of characteristic information, and a plurality of pieces of characteristic information identifying a same image may also be referred to as an eigenvector. For example, one image may include a plurality of pixels, and each pixel is a characteristic of the image. Therefore, information used to identify each pixel may be referred to as a piece of characteristic information of the image, and a set of characteristic information of all pixels forming the image is referred to as an eigenvector. The eigenvector may be represented by a matrix, and each element in the matrix may represent a piece of characteristic information of the image. Further, an eigenvector of a same image further includes a long eigenvector and a short eigenvector. The long eigenvector includes all characteristic information of the same image, and the short eigenvector includes only some characteristic information of the same image. In other words, the same image may be represented by one long eigenvector or by a plurality of short eigenvectors. For ease of description, an example in which a long eigenvector is used to identify each image is used for description in the following description of the embodiments of this disclosure. Unless otherwise specified, all eigenvectors in the following description of the embodiments of this disclosure represent long eigenvectors.

In a possible implementation, in the system architecture shown in FIG. 1, the retrieval server 100 and the database server 201 in the database cluster 200 may be alternatively deployed in an integrated manner. In other words, the database server 201 is configured to process the retrieval task in addition to storing the raw data.

In another possible embodiment, for the database server that stores the data in FIG. 1, instead of cluster deployment, one or more database servers may be directly deployed. In this case, the database servers in the retrieval system may be deployed with distributed database applications, non-distributed database applications, or another form of database applications. This is not limited. Optionally, the retrieval server and one of the database servers may be deployed in an integrated manner.

Data retrieval in this disclosure includes text retrieval, image retrieval, audio retrieval, and video retrieval. For ease of description, in the following embodiments of this disclosure, image retrieval is used as an example for further description. Specifically, data stored in a database is image data, and to-be-retrieved data is also image data.

An example in which a database cluster is deployed in the retrieval system shown in FIG. 1 and the database cluster includes three database servers 201 is used for description in the embodiments of this disclosure. Raw data stored in the database cluster may be stored in the database cluster 200 in one time, or may be updated periodically or in real time. For example, after obtaining image data by using a camera, an application server (not shown in FIG. 1) stores the data in the database server 201 in the database cluster 200.

With reference to the data retrieval system shown in FIG. 1, to resolve a problem of a data retrieval speed and data retrieval precision in a conventional technology, the embodiments of this disclosure provide a data retrieval method, specifically including two parts: a data preparation process and a retrieval process. In the data preparation process, raw data in a database is classified into first-type data and second-type data. In the data retrieval process, retrieval in a narrowed retrieval range is performed in the first-type data, to be specific, a first retrieval range is selected from the first-type data, and then to-be-retrieved data is retrieved in the first retrieval range; brute-force retrieval is performed in the second-type data, to be specific, the to-be-retrieved data is retrieved in an entire range of the second-type data; and finally, a final retrieval result is determined based on a retrieval result of the first-type data and a retrieval result of the second-type data.

A process of classifying the data in the original database into the first-type data and the second-type data includes the following steps: First, the raw data is grouped into a plurality of clusters, where each cluster has one central point, and a cluster index is used to uniquely identify a cluster. Then, data at edge points of all clusters is classified as the second-type data, in other words, the second-type data is a set of data at the edge points of all the clusters. An edge point is data that includes data of two or more clusters in a range with the edge point as a center and a first threshold as a radius. The first-type data is data other than the second-type data in the original database.

Brute-force retrieval means calculating a similarity between the to-be-retrieved data and each piece of second-type data, and selecting, as a matching result, the first n pieces of data sorted in descending order of similarities to the to-be-retrieved data, where n is an integer greater than 1. A similarity between two pieces of data may be determined by calculating a distance between the two pieces of data. Specific distance calculation manners include a Euclidean distance formula and a cosine distance formula. For ease of description, an example in which a distance between two pieces of data is used to identify a similarity between the two pieces of data is used for description in this disclosure. For example, when the Euclidean distance formula is used as a distance calculation formula, a retrieval process includes: calculating distances between to-be-retrieved data and all data in a retrieval range based on the Euclidean distance formula; performing sorting based on the distances; and selecting, as a matching result, the first n pieces of data sorted in ascending order of distances to the to-be-retrieved data.

Retrieval in a narrowed retrieval range means performing clustering on raw data based on similarities and a preset clustering algorithm, where each set of clustered data is referred to as a cluster, each cluster has one central point, and the preset clustering algorithm includes a KMEANS algorithm; calculating a distance between each piece of to-be-retrieved data and a central point of each cluster, and selecting, as a retrieval range, data of clusters to which central points of m clusters that have high similarities to the to-be-retrieved data belong; and calculating distances between the to-be-retrieved data and all data in the selected retrieval range, and performing sorting based on the distances to determine a retrieval result.

It can be learned from the foregoing description that if to-be-retrieved data is retrieved from all data in a database in the brute-force retrieval manner, retrieval precision can be ensured, but the retrieval consumes a relatively long time, and retrieval efficiency is low; and if to-be-retrieved data is retrieved from all data in a database in the manner of using a narrowed retrieval range, time consumption of the retrieval is reduced, but retrieval precision cannot be ensured. Therefore, in this disclosure, the raw data is classified into the first-type data and the second-type data, different retrieval manners are used for the two types of data, and then the retrieval results are compared, to determine the final retrieval result. In this way, a conflict, between retrieval precision and retrieval duration, caused by using only a single retrieval manner in a database is resolved, and a retrieval speed is further increased while retrieval precision is ensured.

The data retrieval method provided in the embodiments of this disclosure is described below in detail with reference to FIG. 2. The data retrieval method includes two parts: a data preparation process and a retrieval process. Steps S110 and S120 are the data preparation process, and steps S130 to S160 are the retrieval process. The data preparation process may be completed in a system initialization process, or data in a database may be updated in real time or periodically based on a service requirement. As shown in the figure, the method includes the following steps.

S110. Group a plurality of eigenvectors in the database into at least two clusters according to a preset clustering algorithm, where each cluster has one central point, each eigenvector belongs to only one cluster, and a cluster index is used to uniquely identify a cluster.

Before a data retrieval task is processed, the data preparation process needs to be completed. To be specific, the data is first classified into first-type data and second-type data. First, the eigenvectors in the database are grouped into two or more sets based on the preset clustering algorithm. Each set may be referred to as a cluster. Each cluster has one central point. Eigenvectors grouped into a same cluster are eigenvectors whose similarities to a central point of the cluster meet a second threshold. In addition, each cluster has a globally unique identifier, and a cluster index of each cluster is used to uniquely identify the cluster. The second threshold may be artificially set based on a service requirement, or may be calculated based on historical data in a retrieval system. This is not limited in this disclosure. The preset clustering algorithm includes a KMEANS clustering algorithm. A principle of the k-means clustering algorithm includes the following steps.

(1) Select k eigenvectors as central points of k clusters, where k is an integer greater than 2.

(2) Traverse all the eigenvectors in the database, calculate distances between each eigenvector and the k central points in (1), and group each eigenvector into a cluster whose central point is at a shortest distance to the eigenvector.

(3) Calculate an average value of all eigenvectors in each cluster, and use the average value as a new central point of the cluster.

(4) Repeat Steps (2) and (3) until k central points that are the same as average values of all the eigenvectors in all the clusters in (3) are obtained, where k obtained eigenvectors are the central points of the k clusters.

After data processing in the foregoing steps (1) to (4), each eigenvector in the database is grouped into a cluster that has a central point whose similarity to the eigenvector meets the second threshold. In this case, an identifier of the cluster is a cluster index of the eigenvector, and the identifier of the cluster may be represented by a number of the cluster.

In a possible embodiment, in a process of determining the cluster to which each eigenvector belongs and the cluster index, because the raw data in the database needs to be processed piece by piece, a relatively large quantity of computing resources of a processor in a retrieval server are occupied in a processing process. Therefore, in actual processing, a plurality of processors or GPUs may be used.

S120. Perform at least one round of data classification processing, where the plurality of eigenvectors in the database are classified into at least one combination of first-type data and second-type data in each round of data classification processing; and divide first-type data obtained in the last round of data classification processing into a plurality of layers based on the at least one combination of first-type data and second-type data, where each layer includes at least one piece of first-type data, and a layer index is used to uniquely identify a layer.

There are hundreds of millions of pieces of data or more data stored in the database. The raw data may be divided into different layers according to the following steps, and a layer index is added to an eigenvector at each layer.

S1201: Perform the at least one round of data classification processing, where the plurality of eigenvectors in the database are classified into the first-type data and the second-type data in each round of data classification processing.

Specifically, to determine a layer at which each eigenvector in the database is located and a layer index, the at least one round of data classification processing needs to be performed, to obtain the at least one combination of first-type data and second-type data. A same method is used in all rounds of data classification processing. For ease of understanding, a process of one round of data classification processing is used as an example below for description. First, one or more clusters are selected as a comparison cluster, and all eigenvectors in the comparison cluster are used as comparison data. Then, each eigenvector in the original database is used as a piece of reference data, and the process of the one round of data classification processing is completed in any one of the following manners.

Manner 1: The raw data is classified into the first-type data and the second-type data in a brute-force retrieval manner.

Each eigenvector in the original database is used as a piece of reference data, a distance between the eigenvector and another eigenvector in the original database is calculated based on a Euclidean distance formula, and to-be-classified data retrieved from the database by using current reference data is determined based on the distance. To be specific, the first n eigenvectors sorted in descending order of similarities to the eigenvector are determined. In other words, eigenvectors corresponding to the first n distances are determined based on an ascending order of distances to the eigenvector. Then, whether the to-be-classified data belongs to comparison data of the comparison cluster in the current round is determined. In other words, whether the n eigenvectors belong to the cluster selected in the current round of data classification processing. If x eigenvectors in the n eigenvectors belong to the cluster selected in the current round of data classification processing, the x eigenvectors are considered as first-type data that affects a speed in the process of the current round of data classification processing. If y eigenvectors in the n eigenvectors do not belong to the selected cluster, the y eigenvectors are considered as second-type data that affects precision in the process of the current round of data classification processing. In this way, the process of the one round of data classification processing is completed. In the parameters, x≤n, y≤n, x+y=n, and n, x, and y are all positive integers greater than or equal to 1.

Figure 3:
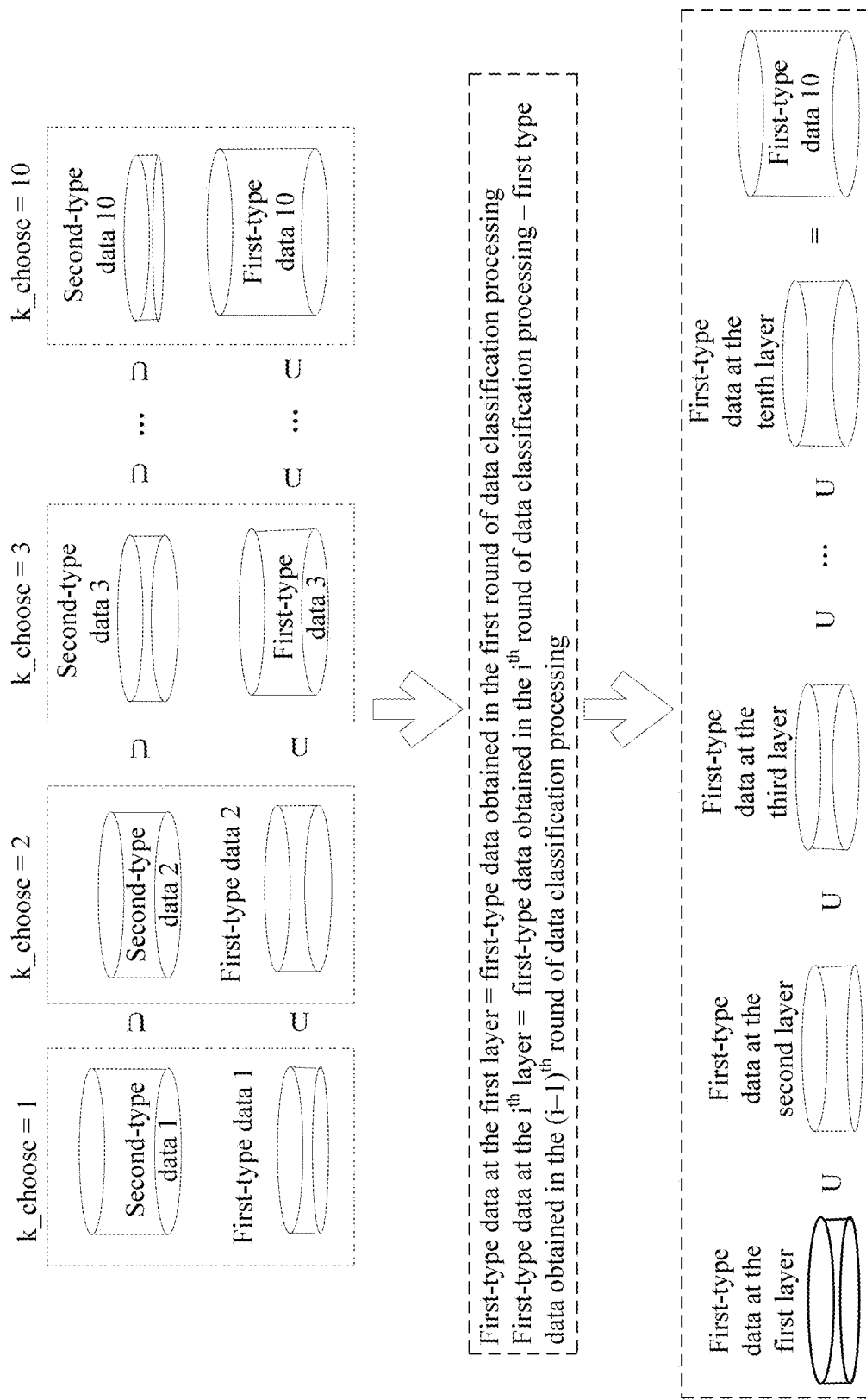
FIG. 3 is a schematic flowchart of a data classification processing method according to this disclosure.

For example, as shown in FIG. 3, k_choose represents a quantity of clusters selected in the process of the current round of data classification processing. When k_choose=1, it indicates that one cluster is selected as the comparison cluster in the process of the current round of data classification processing, and all eigenvectors in the cluster are used as comparison data. For example, a cluster 1 is selected as the comparison cluster, and all eigenvectors in the cluster 1 are used as the comparison data in the current round of data classification processing. Then, each eigenvector in the original database is used as a piece of reference data, and brute-force retrieval is performed for the reference data. To be specific, distances between the eigenvector and all other eigenvectors in the original database are calculated, and then the distances are sorted, to determine the first n eigenvectors sorted in descending order of similarities to the to-be-retrieved eigenvector, namely, eigenvectors corresponding to the first n distances in the foregoing distances sorted in ascending order. Then, whether each of the n eigenvectors belongs to the cluster whose cluster index is 1 is determined. If an eigenvector belongs to the cluster whose cluster index is 1, the eigenvector is used as first-type data 1 that affects a retrieval speed in the process of the current round of data classification processing. If the eigenvector does not belong to the cluster whose cluster index is 1, the eigenvector is used as second-type data 1 that affects retrieval precision in the process of the current round of data classification processing. After the foregoing round of data classification processing, the raw data is classified into two types: the first-type data 1 and the second-type data 1.

Manner 2: The raw data is classified into the first-type data and the second-type data in a manner of using a narrowed retrieval range.

Each eigenvector in the original database is used as a piece of reference data, distances between each piece of reference data and the central points of the clusters obtained through grouping in step S110 are calculated, and eigenvectors of the first m clusters sorted in ascending order of distances to current reference data are selected as to-be-classified data. Then, whether the first m clusters are comparison clusters selected in the process of the current round of data classification processing is determined. If x clusters in the m clusters are clusters selected in the current round of data classification processing, eigenvectors in the x clusters are considered as first-type data that affects a retrieval speed. If y clusters in the m clusters are not comparison clusters selected in the current round of data classification processing, eigenvectors in the y clusters are considered as second-type data that affects retrieval precision. In the parameters, x≤n, y≤n, x+y=n, and n, x, and y are all positive integers greater than or equal to 1.

For example, as shown in FIG. 3, k_choose represents a quantity of comparison clusters selected in the process of the current round of data classification processing. When k_choose is 1, it indicates that one cluster is selected as the comparison cluster in the process of the current round of data classification processing, and all eigenvectors in the cluster are used as comparison data. For example, a cluster 1 is selected as the comparison cluster, and all eigenvectors in the cluster 1 are used as the comparison data in the current round of data classification processing. Then, each eigenvector in the original database is used as a piece of reference data, and retrieval in a narrowed retrieval range is performed for the reference data. In other words, distances between the current reference data and the central points of the clusters obtained through grouping in step S110 are calculated, and clusters to which central points of the first m clusters sorted in ascending order of distances to the current reference data belong are selected as the to-be-classified data. Then, whether the m clusters are comparison clusters selected in the process of the current round of data classification processing is determined. If x clusters in the m clusters are comparison clusters selected in the process of the current round of data classification processing, eigenvectors in the x clusters are considered as first-type data 1 that affects a retrieval speed in the process of the current round of data classification processing. If y clusters in the m clusters are not comparison clusters selected in the process of the current round of data classification processing, eigenvectors in the y clusters are considered as second-type data 1 that affects retrieval precision in the process of the current round of data classification processing.

It can be learned from the foregoing process of the one round of data classification processing that after eigenvectors in one or more comparison clusters are selected as the comparison data, the raw data can be classified into a group of first-type data and second-type data in either the manner 1 or the manner 2. According to a similar method, one cluster, two clusters, three clusters, . . . , or i clusters may be selected as comparison data for performing one round of data classification processing, and the raw data may be classified into a group of first-type data and second-type data in each round of data classification processing. Finally, i sets of first-type data and second-type data are obtained. In a process of each round of data classification processing, comparison clusters in the current round of data classification processing are obtained by adding one or more new clusters to a comparison cluster selected in a previous round of data classification processing. In other words, comparison data in the current round of data classification processing is obtained by adding data of a new cluster to comparison data selected in the previous round of data classification processing. A value range of i is 1≤i≤n, i is a positive integer, and n is a total quantity of clusters obtained through grouping in the original database in step S110.

For example, as shown in FIG. 3, eigenvectors in each of one cluster, two clusters, three clusters, . . . , and 10 clusters are used as comparison data in one round of data classification processing, to perform 10 rounds of data classification processing. When k_choose is 1, all eigenvectors in a cluster 1 are selected as comparison data in a current round of data classification processing, and through processing performed in the manner 1 or the manner 2 in step S1201, first-type data 1 and second-type data 1 are obtained. When k_choose is 2, all eigenvectors in the cluster 1 and a cluster 2 are selected as comparison data in a current round of data classification processing, and through processing performed in the manner 1 or the manner 2 in step S1201, first-type data 2 and second-type data 2 are obtained. When k_choose is 3, all eigenvectors in the cluster 1, the cluster 2, and a cluster 3 are selected as comparison data in a current round of data classification processing, and through processing performed in the manner 1 or the manner 2 in step S1201, first-type data 3 and second-type data 3 are obtained. By analogy, when k_choose is 10, all eigenvectors in the cluster 1, the cluster 2, the cluster 3, . . . , a cluster 9, and a cluster 10 are selected as comparison data in a current round of data classification processing, and through processing performed in the manner 1 or the manner 2 in step S1201, first-type data 10 and second-type data 10 are obtained.

Optionally, one or more clusters may be selected as a comparison cluster/comparison clusters in the first round of data classification processing.

Optionally, during selection of comparison data in each round, comparison clusters in the current round of data classification processing may be obtained by adding, based on a cluster identifier, at least one cluster to comparison data in a previous round of data classification processing. In this case, the comparison data in the current round of data classification processing includes data in the comparison cluster in the previous round and data in the newly added cluster in the current round. The identifier includes a number and a name, other information that can uniquely represent a cluster, or a combination thereof. Alternatively, during selection of comparison data in each round, a cluster may be randomly selected, and the comparison data in the current round of data classification processing is obtained by adding all eigenvectors in the cluster to comparison data selected in a previous round of data classification processing.

For example, it is assumed that the raw data is grouped into six clusters, to perform four rounds of data classification processing. In the first round of data classification processing, a cluster 1 is selected as a comparison cluster; in the second round of data classification processing, the cluster 1 and a cluster 2 are selected as comparison clusters for the second round of data classification processing; in the third round of data classification processing, the cluster 1, the cluster 2, and a cluster 3 are selected as comparison clusters for the third round of data classification processing; and in the fourth round of data classification processing, the cluster 1, the cluster 2, the cluster 3, and a cluster 4 are selected as comparison clusters for the fourth round of data classification processing. Alternatively, in the first round of data classification processing, a cluster 1 and a cluster 2 are selected as comparison data; in the second round of data classification processing, the cluster 1, the cluster 2, and a cluster 3 are selected as comparison clusters for the second round of data classification processing; in the third round of data classification processing, the cluster 1, the cluster 2, the cluster 3, and a cluster 4 are selected as comparison clusters for the third round of data classification processing; and in the fourth round of data classification processing, the cluster 1, the cluster 2, the cluster 3, the cluster 4, and a cluster 5 are selected as comparison clusters for the fourth round of data classification processing.

Optionally, to avoid a problem that a same eigenvector may belong to both the first-type data and the second-type data in one round of data classification processing, when it is determined that an eigenvector belongs to the second-type data, the eigenvector no longer participates in a data classification processing process in which another eigenvector is used as reference data. For example, when a cluster 1 is a comparison cluster in a current round of data classification processing, and an eigenvector 1 is used as current reference data, it is determined that an eigenvector 7 belongs to the second-type data, and therefore when an eigenvector 2 is used as reference data, a similarity between the eigenvector 2 and the eigenvector 7 does not need to be calculated.

It should be noted that for ease of description, the following description of this disclosure is provided by using the following example: In data classification processing shown in FIG. 3, one cluster is used as comparison data in the first round of data classification processing, and in each round of data classification processing other than the first round of data classification processing, comparison clusters of the current round of data classification processing are obtained by adding, based on a cluster number, one cluster to a comparison cluster in a previous round of data classification processing.

S1202. Divide the first-type data obtained in the last round of data classification processing into the plurality of layers based on the at least one combination of first-type data and second-type data, where each layer includes the at least one piece of first-type data, and the layer index is used to uniquely identify a layer.

Based on the foregoing operation process of step S1201, the at least one round of data classification processing may be performed on the raw data. For example, as shown in FIG. 3, each of one cluster, two clusters, three clusters, . . . , and i (for example, i is 10) clusters is/are selected as comparison data to obtain i combinations of first-type data and second-type data shown in FIG. 3. In this case, the first-type data may be divided into layers based on the following formula (1):

first-type data at the first layer=first-type data
obtained in the first round of data classification
processing; and first-type data at the $i^{th}$ layer=first-type data obtained
in the $i^{th}$ round of data classification processing−first-type data obtained in the $(i-1)^{th}$ round
of data classification processing.

An eigenvector of the first-type data at the first layer is an eigenvector corresponding to the first-type data obtained in the first round of data classification processing, and an eigenvector of first-type data at the second layer is an eigenvector obtained by subtracting the first-type data obtained in the first round of data classification processing from first-type data obtained in the second round of data classification processing. In other words, the eigenvector of the first-type data at the second layer is an eigenvector obtained through the first-type data obtained in the second round of data classification processing minus the first-type data obtained in the first round of data classification processing, where $2 \leq i \leq X$, and X is a maximum quantity of rounds of data classification processing. A layer index of the first-type data is used to uniquely identify a layer of the first-type data. The layer index of the first-type data may be identified by i, or may be identified by another character or a combination of a character and data.

Based on the data classification processing process in step S1201 and the formula (1), the first-type data obtained in the last round may be divided into the plurality of layers shown in FIG. 3. In FIG. 3, description is provided by using an example in which 10 rounds of data classification processing are performed in S1201. In this case, a set of all eigenvectors corresponding to layer indexes 1 to 10 of the first-type data is all eigenvectors included in first-type data 10 obtained in the tenth round of data classification processing.

It should be noted that when only one round of data classification processing is performed, one group of first-type data and second-type data can be obtained. In this case, the first-type data includes only one layer.

Optionally, the second-type data may also be divided into a plurality of layers based on the plurality of combinations of first-type data and second-type data that are obtained in the foregoing plurality of rounds of data classification processing, and the plurality of layers may be specifically obtained based on the following formula (2):

second-type data at the first layer=second-type data
obtained in the first round of data classification
processing; and second-type data at the $i^{th}$ layer=second-type data
obtained in the $j^{th}$ round of data classification
processing−second-type data obtained in the
$(j-1)^{th}$ round of data classification processing.

An eigenvector of the second-type data at the first layer is an eigenvector corresponding to the second-type data obtained in the first round of data classification processing, and an eigenvector of second-type data at the second layer is an eigenvector obtained by subtracting the second-type data obtained in the first round of data classification processing from second-type data obtained in the second round of data classification processing. In other words, the eigenvector of the second-type data at the second layer is an eigenvector obtained through the second-type data obtained in the second round of data classification processing minus the second-type data obtained in the first round of data classification processing, where $2 \leq j \leq X$, and X is a maximum quantity of rounds of data classification processing. A layer index of the second-type data is used to uniquely identify a layer of the second-type data. To distinguish between the layer index of the first-type data and the layer index of the second-type data, a numbering manner different from that of the layer index of the first-type data may be used for representing the layer of the second-type data. For example, when the layer index of the first-type data is represented by i, the layer index of the second-type data is represented by 2i+1.

In another possible embodiment, for the second-type data that affects retrieval precision, retrieval needs to be performed in the second-type data piece by piece in a brute-force retrieval manner to ensure retrieval precision. When a relatively high data retrieval speed is required, some data in the second-type data may be alternatively selected for brute-force retrieval based on the layer index and a cluster index of the second-type data, to increase a data retrieval speed.

In another possible embodiment, the plurality of rounds of data classification processing described in step S1201 are independent of each other. The plurality of rounds of data classification processing may be concurrently performed to increase a data processing speed, to finally obtain the plurality of combinations of first-type data and second-type data, and then the first-type data obtained in the last round of data classification processing is divided into the plurality of layers according to the method in step S1202. When being concurrently performed, the plurality of rounds of data classification processing may be completed by one processor by scheduling different tasks, or by different processors by scheduling different tasks. For example, the concurrent processing of the plurality of rounds of data classification processing is completed by one CPU by scheduling different tasks, the concurrent processing of the plurality of rounds of data classification processing is completed by a plurality of CPUs by scheduling different tasks, or the concurrent processing of the plurality of rounds of data classification processing is completed by one or more GPUs, to reduce duration of the data classification processing process and improve data classification processing efficiency.

In another possible embodiment, one layer of the first-type data may be determined after each round of data processing, instead of dividing the first-type data obtained in the last round of data classification processing into the layers in step S120. For example, in a data preparation phase, a total of three rounds of data classification processing are performed. When the first round of data classification processing is completed, it may be determined that first-type data at the first layer is first-type data obtained in the first round of data classification processing. When the second round of data classification processing is completed, it may be determined that first-type data at the second layer is obtained through first-type data obtained in the second round of data classification processing minus the first-type data obtained in the first round of data classification processing. When the third round of data classification processing is completed, it may be determined that first-type data at the third layer is obtained through first-type data obtained in the third round of data classification processing minus the first-type data obtained in the second round of data classification processing. According to the foregoing method, the first-type data may also be divided into a plurality of layers.

According to the description of step S1201 and step S1202, eigenvectors in one or more clusters are selected as comparison data, then the raw data is classified into the plurality of groups of first-type data and second-type data in the brute-force retrieval manner or the retrieval manner of using a narrowed retrieval range, then the first-type data obtained in the last round of data classification processing is divided into the different layers by using the formula (1), and a layer index is added to each eigenvector. In a subsequent data retrieval process, retrieval in the second-type data obtained in the last round of data classification processing is performed in the brute-force retrieval manner to ensure retrieval precision, and retrieval in the first-type data obtained in the last round of data classification processing is performed in the manner of using a narrowed retrieval range to ensure retrieval efficiency. In this way, a retrieval speed and retrieval precision are balanced, and retrieval efficiency is further improved while retrieval precision is ensured.

Through the processing process of the foregoing steps, identifiers, namely layer indexes and cluster indexes, are added to the eigenvectors in the database. Table 1 is an example of a data structure according to an embodiment of this disclosure, and the data structure includes an image identifier and an eigenvector identifier. The image identifier is used to uniquely identify an image in the database. The eigenvector identifier includes characteristic information included in an eigenvector and a cluster index and a layer index of the eigenvector. Optionally, the database further includes collection information of recorded data, and the collection information includes a collection time and a collection location.

TABLE 1

Example of a structure of data in a database

| Image identifier | Eigenvector identifier | | | Collection information | |
|---|---|---|---|---|---|
| | Eigenvector | Cluster index | Layer index | Collection time | Collection location |

In a possible embodiment, the eigenvector identifier shown in Table 1 may further include a long eigenvector, a short eigenvector, a cluster index and a layer index of the long eigenvector, and a cluster index and a layer index of the short eigenvector. In a subsequent retrieval process, if a to-be-retrieved eigenvector is a long eigenvector, to be specific, one long eigenvector includes all characteristic information of one to-be-retrieved image, the retrieval process is processed with reference to the cluster index and the layer index of the long eigenvector in Table 1; or if a to-be-retrieved eigenvector is a short eigenvector, to be specific, two or more short eigenvectors are used to identify all characteristic information of one to-be-retrieved image, the retrieval process is processed with reference to the cluster index and the layer index of the short eigenvector in Table 1.

It should be noted that a quantity of rounds of data classification processing in step S1201 is directly proportional to subsequent retrieval efficiency. In other words, a larger quantity of iterative rounds of data classification processing indicates a larger quantity of obtained combinations of first-type data and second-type data and a smaller amount of data classified in step S1202 as the second-type data that affects retrieval precision. Correspondingly, in subsequent retrieval processing, an amount of data that requires brute-force retrieval is reduced, time consumption of retrieval is reduced, and retrieval precision is improved. For the first-type data that affects a retrieval speed, a larger quantity of rounds of data classification processing indicates a larger quantity of obtained combinations of first-type data and second-type data and a larger quantity of layers of the first-type data that are obtained when the first-type data is divided into layers based on a plurality of combinations of first-type data and second-type data. In a subsequent data retrieval process, a retrieval range may be further determined in the first-type data based on a layer relationship obtained through division, and then to-be-retrieved data is retrieved in the retrieval range, thereby reducing time consumption of retrieval.

In a possible implementation, the raw data may be divided into a plurality of layers by using another preset algorithm instead of the foregoing method in which the raw data is divided into the plurality of layers through the plurality of rounds of data classification processing. A central point of each cluster and an eigenvector that is in each cluster and whose distance to the central point of the cluster is less than or equal to a third threshold may be grouped into the first layer, an eigenvector that is in each cluster and whose distance to the central point of the cluster is less than or equal to a fourth threshold may be grouped into the second layer, . . . , and an eigenvector that is in each cluster and whose distance to the central point of the cluster is greater than an $n^{th}$ threshold may be grouped into the $n^{th}$ layer, where n≥1.

The data classification method provided in this embodiment of this disclosure is merely an example. Alternatively, the raw data in the database may be classified into two types by using another method, and different retrieval methods are performed. For example, each eigenvector is classified as the first-type data or the second-type data based on a distance between the eigenvector and a central point of a cluster in which the eigenvector is located.

The processing process of the data preparation phase provided in this embodiment of this disclosure is described above. The data retrieval process provided in this embodiment of this disclosure is further described below with reference to steps S130 to S160.

S130. Calculate distances between a to-be-retrieved eigenvector and central points of all the clusters, and sort all the clusters based on the distances between the to-be-retrieved eigenvector and the central points of all the clusters.

When a to-be-retrieved image is received, first, an eigenvector corresponding to the to-be-retrieved image is obtained. Then, distances between the to-be-retrieved eigenvector and the central points of all the clusters obtained through grouping in step S110 are calculated, and all the clusters are sorted based on the distances between the to-be-retrieved eigenvector and the central points of all the clusters, so that the clusters are in descending order of similarities to the to-be-retrieved eigenvector, in other words, in ascending order of distances to the to-be-retrieved eigenvector. Subsequently, one or more clusters may be selected based on the similarities between the to-be-retrieved eigenvector and the clusters to further determine a retrieval range of a current retrieval task, and then a retrieval operation is performed to obtain a retrieval result. For example, the raw data in the database is grouped into three clusters: a cluster 1, a cluster 2, and a cluster 3, and distances, calculated based on the Euclidean distance formula, between the to-be-retrieved eigenvector and central points of the cluster 1, the cluster 2, and the cluster 3 are 3, 4.5, and 1. Therefore, the cluster 3, the cluster 1, and the cluster 2 are in descending order of similarities to the to-be-retrieved eigenvector.

S140. In the first-type data, select eigenvectors that are in A clusters and whose layer indexes belong to selected B layers, and perform retrieval in a narrowed retrieval range, to obtain at least one first retrieval result, where 1≤A≤a, 1≤B≤b, a is a total quantity of clusters obtained through grouping in the database, b is a total quantity of layers into which the first-type data is divided, a≥1, b≥1, and a, b, A, and B are all positive integers.

The first-type data is the first-type data obtained in the last of the plurality of rounds of data classification processing performed in step S120. A method for selecting the A clusters is: selecting the first A clusters after the clusters are sorted in descending order of similarities to the to-be-retrieved eigenvector in step S130. A method for selecting the B layers is: determining the B layers based on a number of a layer index. A and B are values preset based on a service requirement. For example, A may be 3, and B is 2. In this case, in the first-type data, the first three clusters sorted in ascending order of distances to the to-be-retrieved eigenvector are selected, and eigenvectors that are in the three clusters and whose layer indexes belong to selected two layers are selected as a first retrieval range. Distances between the to-be-retrieved eigenvector and all data are calculated in the first retrieval range, and the distances are sorted, to obtain an eigenvector that is at a shortest distance to the to-be-retrieved eigenvector as a retrieval result of the first-type data. For ease of subsequent description, the retrieval result obtained through the retrieval in the first-type data is referred to as a first retrieval result.

Optionally, a method for selecting the B layers may be: selecting the B layers based on an identifier of a layer index, or randomly selecting the B layers. In addition, A and B may be artificially specified. This is not limited in this disclosure.

S150. Perform brute-force retrieval in eigenvectors in the second-type data, to obtain a second retrieval result.

The second-type data is the second-type data obtained in the last of the plurality of rounds of data classification processing performed in step S120. The second-type data is a set of eigenvectors with relatively low similarities to another eigenvector in the original database, and whether the second-type data is used as a retrieval range affects retrieval precision. Therefore, to improve retrieval precision of the retrieval process, brute-force retrieval needs to be performed in all of the second-type data. In other words, distances between the to-be-retrieved eigenvector and all of the second-type data are calculated, to determine an eigenvector that is at a shortest distance to the to-be-retrieved eigenvector as a retrieval result of the second-type data. In this way, precision of the retrieval process is ensured. To be distinguished from the retrieval result obtained in step S140, the retrieval result obtained by performing brute-force retrieval in the second-type data is referred to as a second retrieval result.

Optionally, based on the layer division of the eigenvectors in step S120, to improve retrieval efficiency, at least one piece of second-type data may be selected from the second-type data as a second retrieval range based on a cluster index and a layer index, and brute-force retrieval is performed in the second retrieval range to obtain at least one second distance as a retrieval result.

It should be noted that step S140 and step S150 may be performed in no particular order. Step S140 may be performed before step S150, step S150 may be performed before step S140, or step S140 and step S150 may be simultaneously performed.

S160. Determine a final retrieval result based on the first retrieval result and the second retrieval result.

Specifically, a process of determining a matched eigenvector includes: comparing the first retrieval result and the second retrieval result, and selecting a retrieval result with a highest similarity to the to-be-retrieved eigenvector as the final retrieval result. To be specific, the first retrieval result and the second retrieval result are sorted, and an eigenvector at a shortest distance to the to-be-retrieved eigenvector is selected as an eigenvector that matches the to-be-retrieved eigenvector. In other words, the retrieval result with the highest similarity to the to-be-retrieved eigenvector is selected as the final retrieval result.

According to the description of content in steps S110 to S150, in the data preparation phase, the raw data is first grouped into the plurality of clusters, then, the raw data is classified into the plurality of combinations of first-type data and second-type data, the first-type data obtained in the last round of data classification processing is divided into the plurality of layers with reference to the plurality of combinations of first-type data and second-type data, and finally, the second-type data that affects retrieval precision and the first-type data that affects a speed are obtained. In the retrieval process, for the first-type data, the retrieval range of the first-type data is determined based on a layer index and a cluster index of each eigenvector, and retrieval in a narrowed retrieval range is performed in this part of data; brute-force retrieval is performed in the second-type data; and finally, the retrieval results obtained in the retrieval processes of the first-type data and the second-type data are sorted, and the eigenvector with the highest similarity to the to-be-retrieved eigenvector is determined as the final retrieval result. In the foregoing retrieval process, the eigenvectors in the original database are first classified, to identify the second-type data that affects retrieval precision and that has a relatively low similarity to another eigenvector, and brute-force retrieval is performed in the second-type data, to ensure retrieval precision. In addition, retrieval in a narrowed range is performed in an eigenvector that affects a retrieval speed and that has a high similarity to the another eigenvector in the original database, to ensure a retrieval speed. A combination of the two retrieval manners ensures precision and a speed of the entire retrieval process, reduces time consumption of the retrieval process, and improves efficiency of the retrieval process.

Figure 2:
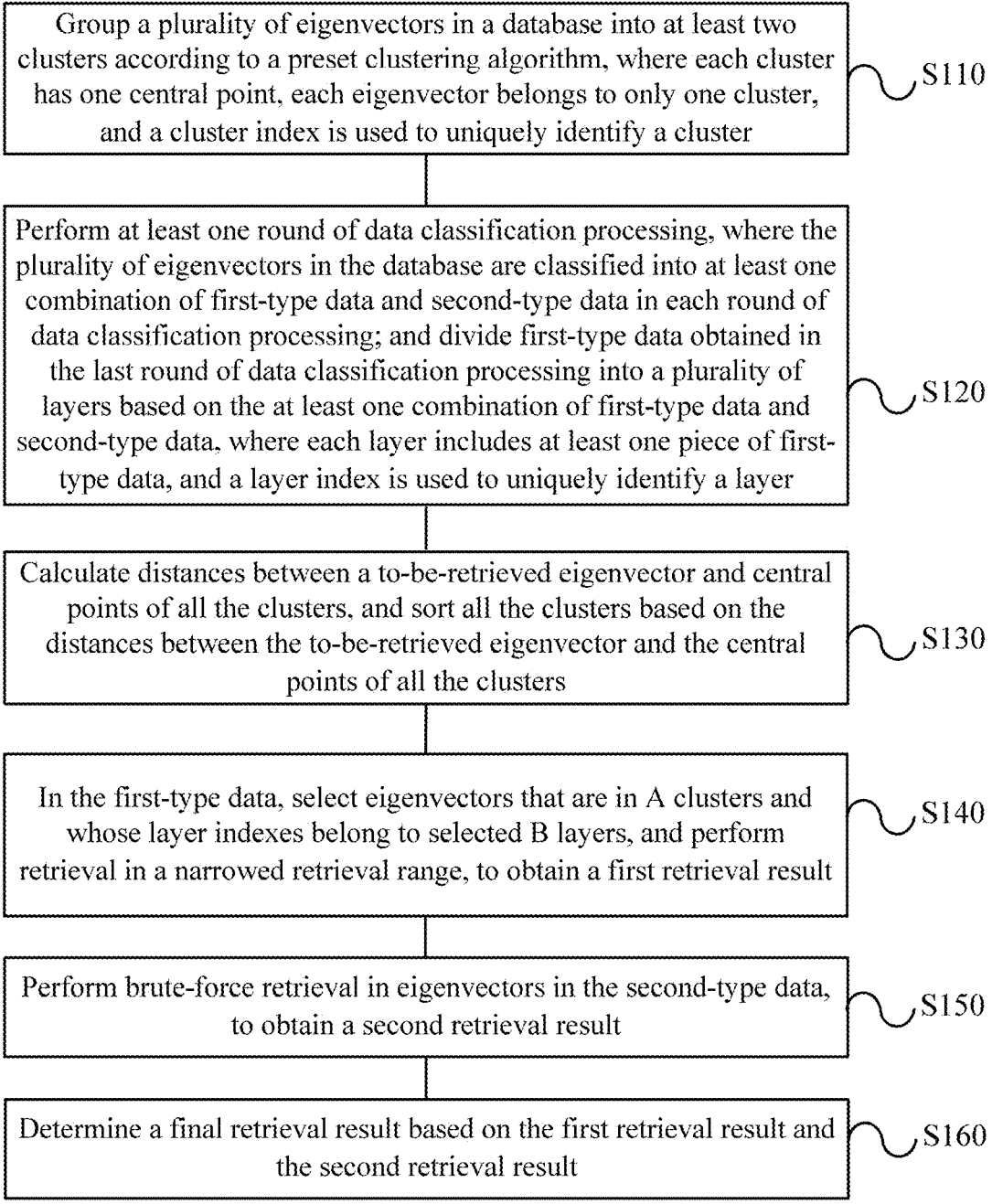
FIG. 2 is a schematic flowchart of a data retrieval method according to this disclosure.

In a possible embodiment, in the retrieval method described in FIG. 2, to further improve retrieval precision, in an actual retrieval process, eigenvectors that are in C clusters and whose layer indexes belong to selected B layers may be alternatively selected for retrieval in a narrowed retrieval range. C is A plus a first offset value, the first offset value is an integer greater than or equal to 1, $1 \leq A \leq a$, $1 \leq B \leq b$, a is a total quantity of clusters obtained through grouping in the database, b is a total quantity of layers into which the first-type data is divided, $a \geq 1$, $b \geq 1$, and a, b, A, B, and C are all positive integers. The first offset value is a preset value. During specific implementation, the first offset value may be set based on a retrieval precision requirement, and the first offset value is a positive integer greater than or equal to 1. In other words, in the retrieval process, the eigenvectors that are in the C clusters and whose layer indexes belong to the selected B layers are selected as a retrieval range for retrieval in a narrowed retrieval range. The method for retrieval in a narrowed retrieval range is used to increase a retrieval speed, some data with relatively high similarities may be selected as a retrieval range in the retrieval process, and a size of the retrieval range affects retrieval precision. In this embodiment of this disclosure, the first offset value is added to a first value selected by a user, so that a retrieval range selected by the user can be properly extended, to further improve retrieval precision.

In a possible embodiment, in the retrieval method described in FIG. 2, based on a layer division result of the first-type data, to further improve retrieval precision, in an actual retrieval process, eigenvectors that are in A clusters and whose layer indexes belong to selected D layers may be alternatively selected for retrieval in a narrowed retrieval range. D is B plus a second offset value, and the second offset value is an integer greater than or equal to 1, $1 \leq A \leq a$, $1 \leq B \leq b$, a is a total quantity of clusters obtained through grouping in the database, b is a total quantity of layers into which the first-type data is divided, $a \geq 1$, $b \geq 1$, and a, b, A, B, and D are all positive integers. The second offset value is a preset value. During specific implementation, the second offset value may be set based on a retrieval precision requirement. In other words, in the retrieval process, eigenvectors obtained by adding eigenvectors at layers whose quantity is the second offset value to the eigenvectors that are in the A clusters and whose layer indexes belong to the user-selected B layers may be selected as a retrieval range for retrieval in a narrowed retrieval range. In the foregoing embodiment, the layers whose quantity is the second offset value are added to the user-selected B layers to properly extend a retrieval range. During specific implementation, retrieval precision may also be further improved.

In a possible embodiment, in the retrieval method described in FIG. 2, based on a layer division result of the first-type data, to further improve retrieval precision, in an actual retrieval process, eigenvectors that are in E clusters and whose layer indexes belong to selected F layers may be alternatively selected for retrieval in a narrowed retrieval range. E is A plus a first offset value, and F is B plus a second offset value. $1 \leq A \leq a$, $1 \leq B \leq b$, a is a total quantity of clusters obtained through grouping in the database, b is a total quantity of layers into which the first-type data is divided, $a \geq 1$, $b \geq 1$, and a, b, A, B, E and F are all positive integers. Both the first offset value and the second offset value are integers greater than or equal to 1. In addition, both the first offset value and the second offset value are preset values. During specific implementation, the first offset value and the second offset value may be set based on a retrieval precision requirement. In other words, in the retrieval process, eigenvectors in clusters whose quantity is the first offset value and eigenvectors at layers whose quantity is the second offset value are added to the eigenvectors that are in the user-selected A clusters and whose layer indexes belong to the user-selected B layers, and a result of the addition is used as a retrieval range for retrieval in a narrowed retrieval range. This extends a retrieval range. In the foregoing embodiment, the clusters whose quantity is the first offset value and the layers whose quantity is the second offset value are added to the user-selected clusters and layers to properly extend the retrieval range. During specific implementation, retrieval precision may also be further improved.

In another possible embodiment, in the data preparation process, during grouping of cluster indexes and division of layer indexes in the original database, the data in the original database may be alternatively grouped into sub-databases, and clustering and layer division may be performed on data in each sub-database. During data retrieval, for each to-be-retrieved eigenvector, with reference to the processing process of steps S130 to S150, eigenvectors at a layer and eigenvectors in a cluster in each sub-database are selected as a retrieval range for retrieval; and finally, according to the content described in step S160, a plurality of distances are sorted, and a matched eigenvector is determined based on a distance order. In the foregoing process, time consumption of data preparation can be effectively reduced. In addition, during specific implementation, different hardware (for example, GPUs) may be used for clustering and layer division for different sub-databases, and then retrieval is performed in a selected retrieval range. This can effectively improve data preparation and retrieval efficiency. Because each sub-database includes less data than the original database, an amount of reference data is smaller in each round of data classification processing. When an eigenvector in each sub-database is used as reference data to calculate a distance between the eigenvector and other data, a calculation amount is less than that for the same reference data in the original database. In the foregoing manner, the database is divided into the plurality of sub-databases, first-type data and second-type data are obtained through classification in each sub-database, and then to-be-retrieved data is retrieved. This can also ensure retrieval precision and reduce retrieval duration.

It should be noted that the foregoing method embodiment is merely an example, and is expressed as a combination of a series of actions for ease of description. However, a person skilled in the art should appreciate that this disclosure is not limited to the described order of the actions. A step combination that a person skilled in the art can figure out based on the foregoing content, a combination of all or some of the operation steps of the method, and other proper step combinations that a person skilled in the art can figure out also fall within the protection scope of this disclosure.

Figure 4:
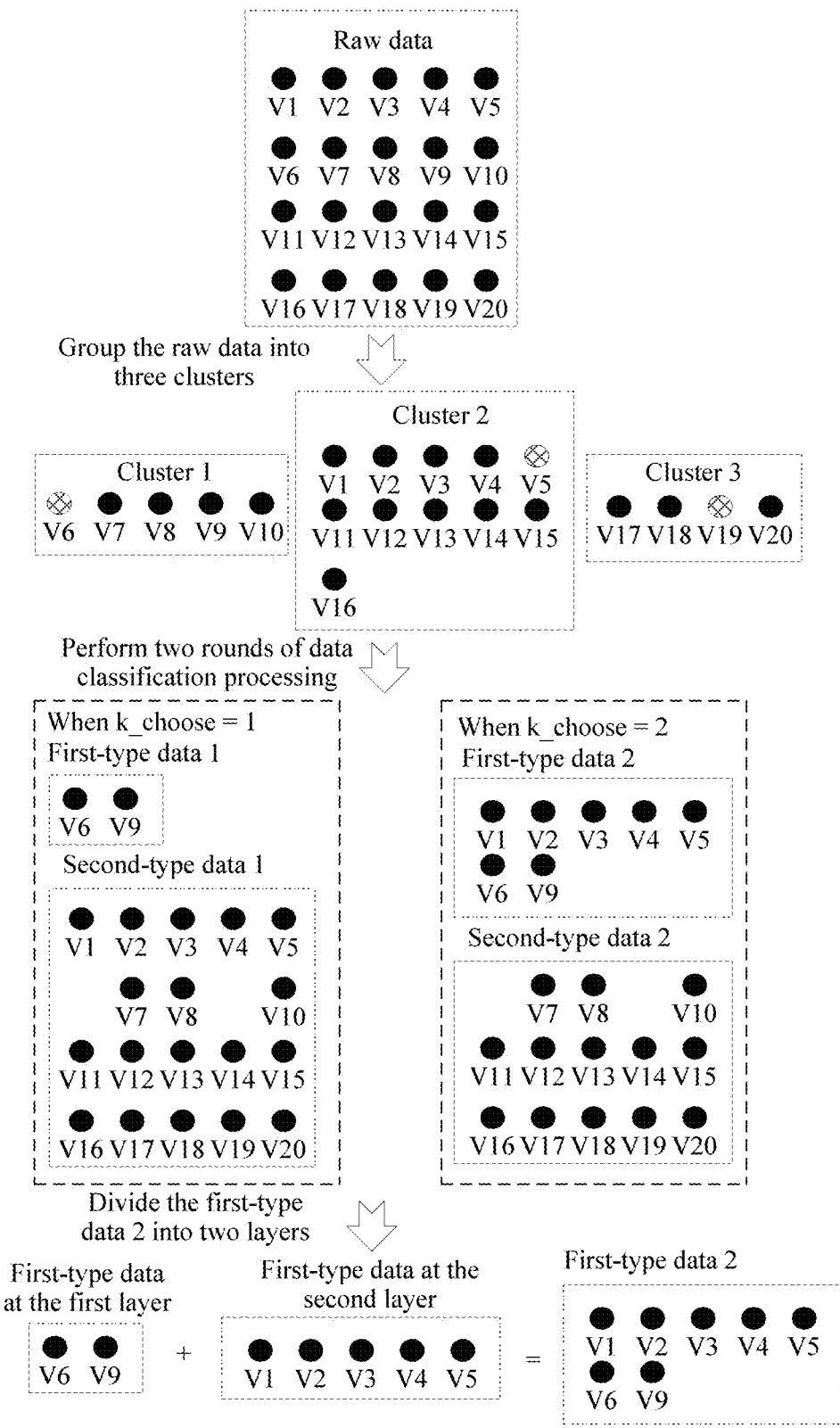
FIG. 4 is a schematic flowchart of another data classification processing method according to this disclosure.

With reference to an example shown in FIG. 4, the data retrieval method provided in the embodiments of this disclosure is further described by using the following example: In an image retrieval process, the raw data in the database is images, each image is represented by using an eigenvector, and during data classification processing, the first-type data and the second-type data are determined in the manner 1 in step S1201. As shown in the figure, the original database includes eigenvectors V1, V2, . . . , and V20 that correspond to 20 images.

In a data preparation process, the raw data is first grouped into a cluster 1, a cluster 2, and a cluster 3 according to a preset clustering (for example, k-means) algorithm. A central point of the cluster 1 is V6, a central point of the cluster 2 is V5, and a central point of the cluster 3 is V19. Then, two rounds of data classification processing are performed. In the first round of data classification processing, the cluster 1 is selected as a comparison cluster, and data in the cluster 1 is comparison data for the first round of data classification processing. Each eigenvector in the original database is used as reference data. For example, V1 is used as current reference data, Euclidean distances between V1 and V2, V3, . . . , and V20 are calculated, and V2, V10, V3, . . . , and V7 are in ascending order of distances to V1. It is assumed that the first three eigenvectors in order of distances are obtained as to-be-classified data when V1 is the current reference data, in other words, V20, V10, and V3 are selected as the to-be-classified data when V1 is the current reference data. Then, whether V20, V9, and V3 belong to the cluster 1 (the comparison data selected in the first round of data classification processing) is determined. Finally, it is determined that V20 and V3 are not in the cluster 1, and V9 is in the cluster 1. In this case, it may be determined that V9 is first-type data, V20 and V3 are second-type data. Then, V2 is used as current reference data, and Euclidean distances between V2 and the other eigenvectors other than V20 and V3 in the raw data are calculated. Then, the other eigenvectors are sorted in ascending order of distances to V2, and the first three corresponding eigenvectors V6, V3, and V19 are selected. Finally, it is determined that V6 belongs to the cluster 1, and V3 and V19 do not belong to the cluster 1. In this case, V6 belongs to the first-type data, and V3 and V19 belong to the second-type data. By analogy, after a plurality of times of processing, the raw data is classified into first-type data 1 and second-type data 1. The first-type data 1 includes V6 and V9, and the second-type data 1 includes eigenvectors other than V6 and V9. According to a method similar to that of the first round of data classification processing, in a process of the second round of data classification processing, the cluster 1 and the cluster 2 are selected as comparison clusters for the second round of data classification processing, and all eigenvectors in the cluster 1 and the cluster 2 are used as comparison data for the second round of data classification processing. Each eigenvector is used as reference data to determine whether other eigenvectors belong to first-type data 2. Finally, it is determined that the first-type data 2 includes V1, V2, V3, V4, V5, V6, and V9, and second-type data 2 includes V7, V8, V10, V11, V12, V13, V14, V15, V16, V17, V18, V19, and V20. Then, based on the foregoing two rounds of data classification processing, the first-type data 2 is divided into two layers with layer indexes 1 and 2. First-type data at the first layer is V6 and V9, and first-type data at the second layer is V1, V2, V3, V4, and V5.

In a data retrieval phase, when to-be-retrieved data is received (for example, if the to-be-retrieved data is an image, an eigenvector of the image needs to be first extracted as the to-be-retrieved data), distances between the to-be-retrieved data and the central points of all the clusters are first calculated, and then sorting is performed based on the distances. It is assumed that the cluster 1, the cluster 2, and the cluster 3 are in ascending order of distances. It is assumed that data in two clusters and one layer is selected from the first-type data as a first retrieval range. Then, data that is in the cluster 1 and the cluster 2 and whose layer index is 1 is selected from the first-type data 2 as the first retrieval range based on the first-type data 2 and the second-type data 2 that are obtained in the second round of data classification processing. In this case, data in the first retrieval range includes V6 and V9. Then, distances between the to-be-retrieved data and V6 and V9 are calculated. It is assumed that the distances between the to-be-retrieved data and V6 and V9 are 6 and 9. Then, in the second-type data 2, distances between the to-be-retrieved data and all eigenvectors in the second-type data 2 are calculated in the brute-force retrieval manner. It is assumed that distances between the to-be-retrieved data and V7, V8, V10, V11, V12, V13, V14, V15, V16, V17, V18, V19, and V20 are 7, 8, 10, 11, 12, 13, 14, 15, 16, 17, 18, 19, and 20. Finally, the distances are sorted, and an ascending order is 6, 7, 8, 9, 10, 11, 12, 13, 14, 15, 16, 17, 18, 19, and 20. It can be learned from the foregoing distance sorting result that an eigenvector at a shortest distance to the to-be-retrieved data is V6, in other words, V6 is an eigenvector with a highest similarity to the to-be-retrieved data. In this case, it may be finally determined that V6 is a final retrieval result of the to-be-retrieved data.

It can be learned from the example in FIG. 4 that according to the data retrieval method in this disclosure, the raw data is classified into the first-type data and the second-type data in the data preparation phase, the first-type data is divided into the plurality of layers, a retrieval range is determined in the first-type data based on a cluster and a layer, and in the retrieval range, retrieval in a narrowed retrieval range is performed; in the second-type data, brute-force retrieval is performed; and then, the final retrieval result is determined based on the retrieval results of the foregoing retrieval processes. In this way, a problem of precision and a speed in a conventional technology is resolved, and retrieval efficiency is further improved while retrieval precision is ensured.

The retrieval method provided in the embodiments of this disclosure is described above in detail with reference to FIG. 1 to FIG. 4. A data retrieval apparatus and a heterogeneous server system that are provided in the embodiments of this disclosure are described below with reference to FIG. 5 to FIG. 7.

Figure 5:
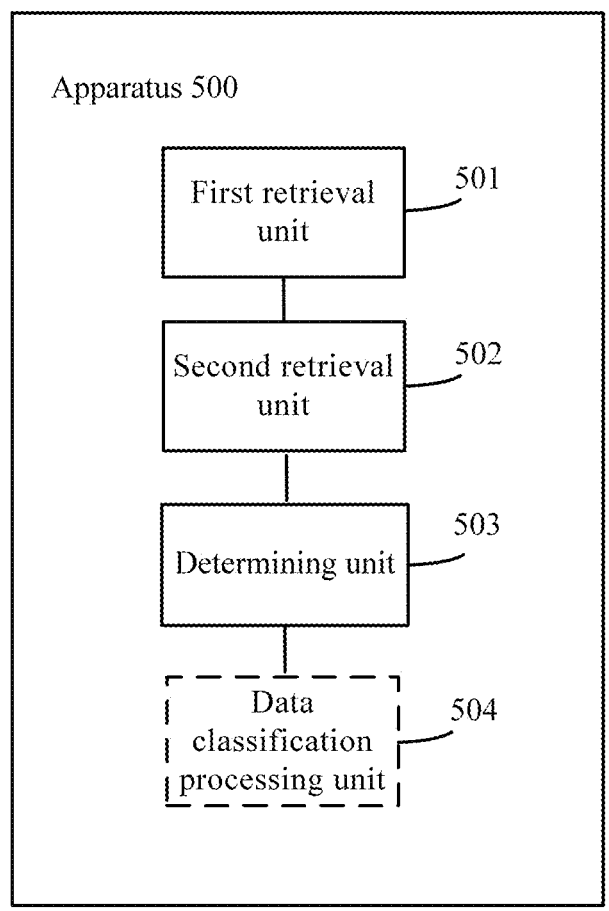
FIG. 5 is a schematic structural diagram of a data retrieval apparatus according to this disclosure.

FIG. 5 is a schematic structural diagram of a retrieval apparatus according to an embodiment of this disclosure. As shown in the figure, the data retrieval apparatus 500 includes a first retrieval unit 501, a second retrieval unit 502, and a determining unit 503. N pieces of data are stored in a database, the N pieces of data in the database are classified into first-type data and second-type data, and N≥2.

The first retrieval unit 501 is configured to: determine a first retrieval range in the first-type data, and retrieve to-be-retrieved data in the first retrieval range, to obtain a first retrieval result, where data in the first retrieval range is a subset of the first-type data.

The second retrieval unit 502 is configured to retrieve the to-be-retrieved data in an entire range of the second-type data, to obtain a second retrieval result.

The determining unit 503 is configured to determine a final retrieval result of the to-be-retrieved data from the first retrieval result and the second retrieval result.

Optionally, the apparatus 500 further includes a data classification processing unit 504. The data classification processing unit 504 is configured to group the N pieces of data into M clusters according to a clustering algorithm, where each piece of data corresponds to one cluster, each cluster has one central point, a value of each piece of data has a high similarity to a central point of a cluster to which the data belongs, M≥2, and a cluster index of each cluster is used to uniquely identify the cluster. The second-type data is a set of data at edge points of all the clusters, and the first-type data is a set of data other than the second-type data in the original database.

Optionally, the data classification processing unit 504 is further configured to divide the first-type data into a plurality of layers according to a preset algorithm, where each layer includes at least one piece of first-type data, each piece of first-type data belongs to one layer, and a layer index of each layer is used to uniquely identify the layer.

Optionally, the data classification processing unit 504 is further configured to: select a comparison cluster from the M clusters; select z pieces of reference data from the N pieces of data, where 1≤z≤N; and perform the following data classification processing for each piece of reference data: obtaining to-be-classified data through retrieval from the database based on current reference data, where the to-be-classified data is data that has a high similarity to the current reference data; and determining whether the to-be-classified data belongs to the comparison cluster, and if the to-be-classified data belongs to the comparison cluster, classifying the to-be-classified data as the first-type data, or if the to-be-classified data does not belong to the comparison cluster, classifying the to-be-classified data as the second-type data.

Optionally, the data classification processing unit 504 is further configured to: calculate similarities between the current reference data and the other N−1 pieces of data, perform sorting based on the calculated similarities to obtain m pieces of data sorted in descending order of similarities to the current reference data, and use the m pieces of data as the to-be-classified data, where 1≤m≤N−1; or calculate similarities between the current reference data and central points of the M clusters, determine m clusters sorted in descending order of similarities to the current reference data, and use data in the m clusters as the to-be-classified data, where 1≤m≤N−1.

Optionally, the data classification processing unit 504 is further configured to: when i=N, select each of the N pieces of data as the current reference data.

Optionally, the data classification processing unit 504 is further configured to: after completing a round of data classification processing by using each of the N pieces of data as the current reference data, perform a next round of data classification processing by using each of the i pieces of data as reference data again. A same comparison cluster is selected in all rounds of data classification processing, a quantity of comparison clusters selected in a current round of data classification processing is greater than a quantity of comparison clusters selected in a previous round of data classification processing, a comparison cluster selected in the previous round of data classification processing is a subset of comparison clusters selected in the current round of data classification processing, and when a quantity of comparison clusters reaches a preset maximum value, data classification processing ends.

Optionally, the data classification processing unit 504 is further configured to obtain a classification result in each round of data classification processing. The $X^{th}$ classification result in the $X^{th}$ round of data classification processing is a final classification result, and the $X^{th}$ round of data classification processing is the last round of data classification processing. The data classification processing unit 504 is further configured to divide first-type data obtained in the last round of data classification processing into layers. First-type data at the first layer is first-type data obtained in the first round of data classification processing. First-type data at the $j^{th}$ layer=first-type data obtained in the $j^{th}$ round of data classification processing−first-type data obtained in the $(j-1)^{th}$ round of data classification processing, where 2≤j≤X.

Optionally, the data classification processing unit 504 is further configured to configure a cluster index and a layer index for each of the N pieces of data based on a clustering result and a layer division result of the data.

Optionally, the first-type data has a cluster index and a layer index. The first retrieval unit 501 is further configured to: preset indication information of the first retrieval range, where the indication information is used to indicate a cluster and a layer that are included in the first retrieval range; and determine, based on the to-be-retrieved data and the indication information, a cluster index of the cluster included in the first retrieval range and a layer index of the layer included in the first retrieval range.

It should be understood that the apparatus 500 may be implemented by using an ASIC, or may be implemented by using a programmable logic device (PLD). The PLD may be a complex PLD (CPLD), an FPGA, generic array logic (GAL), or any combination thereof. Alternatively, the retrieval method shown in FIG. 2 may be implemented by using software, and in this case, the apparatus 500 and the modules of the apparatus 500 may be software modules.

The apparatus 500 according to this embodiment of this disclosure may correspondingly perform the method described in the embodiments of this disclosure. In addition, the foregoing and other operations and/or functions of the units in the apparatus 500 are respectively used to implement corresponding procedures of the method in FIG. 2. For brevity, details are not described herein again.

According to the foregoing description, in the data preparation process, the raw data is classified into the first-type data that affects retrieval precision and the second-type data that affects a retrieval speed, and then the first-type data is divided into the plurality of layers. In the data retrieval process, for the first-type data, the first retrieval range is determined based on a layer index and a cluster index of each eigenvector, and retrieval in a narrowed range is performed in this part of data; and for the second-type data, brute-force retrieval is performed in all of the second-type data. Finally, the retrieval results obtained in the retrieval processes of the first-type data and the second-type data are compared, to determine the data with the highest similarity to the to-be-retrieved eigenvector as the final retrieval result. In the foregoing retrieval process, the second-type data that affects precision is first identified in the data preparation phase, and brute-force retrieval is performed in the second-type data, to ensure retrieval precision. In addition, for eigenvectors that affect a retrieval speed, retrieval is performed in a narrowed retrieval range to ensure a retrieval speed. A combination of the two retrieval manners ensures precision and a speed of the entire retrieval process, reduces time consumption of the retrieval process, and improves efficiency of the retrieval process.

Figure 6:
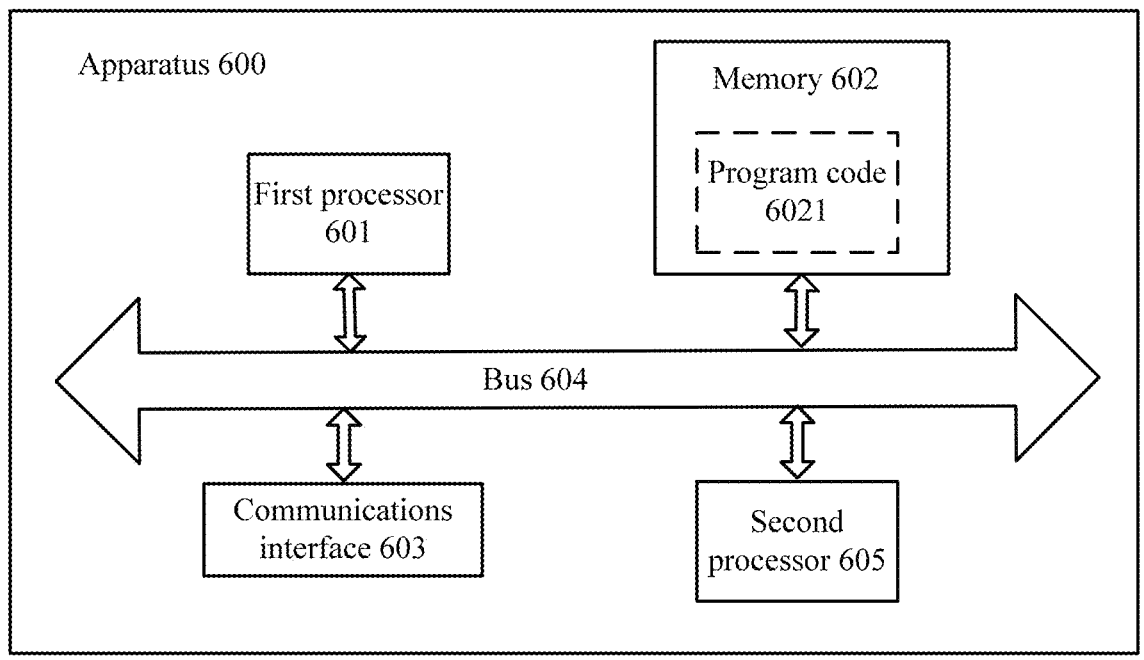
FIG. 6 is a schematic structural diagram of another data retrieval apparatus according to this disclosure.

FIG. 6 is a schematic diagram of another data retrieval apparatus according to an embodiment of this disclosure. As shown in the figure, the apparatus 600 includes a first processor 601, a memory 602, a communications interface 603, and a bus 604. The first processor 601, the memory 602, and the communications interface 603 communicate with each other by using the bus 604, or may communicate with each other in another manner such as wireless transmission. The memory 602 is configured to store program code 6021, and the first processor 601 is configured to invoke the program code 6021 stored in the memory 602, to perform the following operations: determining a first retrieval range in the first-type data, and retrieving to-be-retrieved data in the first retrieval range, to obtain a first retrieval result, where data in the first retrieval range is a subset of the first-type data; retrieving the to-be-retrieved data in an entire range of the second-type data, to obtain a second retrieval result; and determining a final retrieval result of the to-be-retrieved data from the first retrieval result and the second retrieval result.

Optionally, the apparatus 600 may further include a second processor 605. The first processor 601, the memory 602, the communications interface 603, and the second processor 605 communicate with each other by using the bus 604. The second processor 605 is configured to assist the first processor 601 in executing a data retrieval task.

It should be understood that in this embodiment of this disclosure, the first processor 601 may be a CPU, or the first processor 601 may be another general-purpose processor, a DSP, an ASIC, an FPGA, or another programmable logic device, a discrete gate or a transistor logic device, a discrete hardware component, or the like. The general-purpose processor may be a microprocessor, any conventional processor, or the like.

The second processor 605 may be a dedicated retrieval processor, for example, a GPU or an NPUC, may be a CPU, or may be another general purpose processor, a DSP, an ASIC, an FPGA, or another programmable logic device, a discrete gate or a transistor logic device, a discrete hardware component, or the like. The general-purpose processor may be a microprocessor, any conventional processor, or the like.

Optionally, when the second processor is a GPU, the apparatus 600 further includes a video RAM.

It should be noted that the first processor 601 and the second processor 605 in the apparatus 600 shown in FIG. 6 are merely examples, and quantities of first processors 601 and second processors 605 and a quantity of cores of each processor constitute no limitation on this embodiment of this disclosure.

The memory 602 may be a volatile memory or a nonvolatile memory, or may include both a volatile memory and a nonvolatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random-access memory (RAM), and is used as an external cache. By way of example but not limitation, many forms of RAMs may be used, for example, a static RAM (SRAM), a dynamic RAM (DRAM), a synchronous DRAM (SDRAM), a double data rate SDRAM (DDR SDRAM), an enhanced SDRAM (ESDRAM), a SynchLink DRAM (SLDRAM), and a direct Rambus RAM (DR RAM).

The bus 604 may include a power bus, a control bus, a status signal bus, and the like in addition to a data bus. However, for clear description, various types of buses are marked as the bus 604 in the figure.

It should be understood that the apparatus 600 according to this embodiment of this disclosure may correspond to the apparatus 500 in the embodiments of this disclosure, and may correspondingly perform the method in FIG. 2 in the embodiments of this disclosure. In addition, the foregoing and other operations and/or functions of the modules in the apparatus 600 are respectively used to implement corresponding procedures of the method in FIG. 2. For brevity, details are not described herein again.

Figure 7:
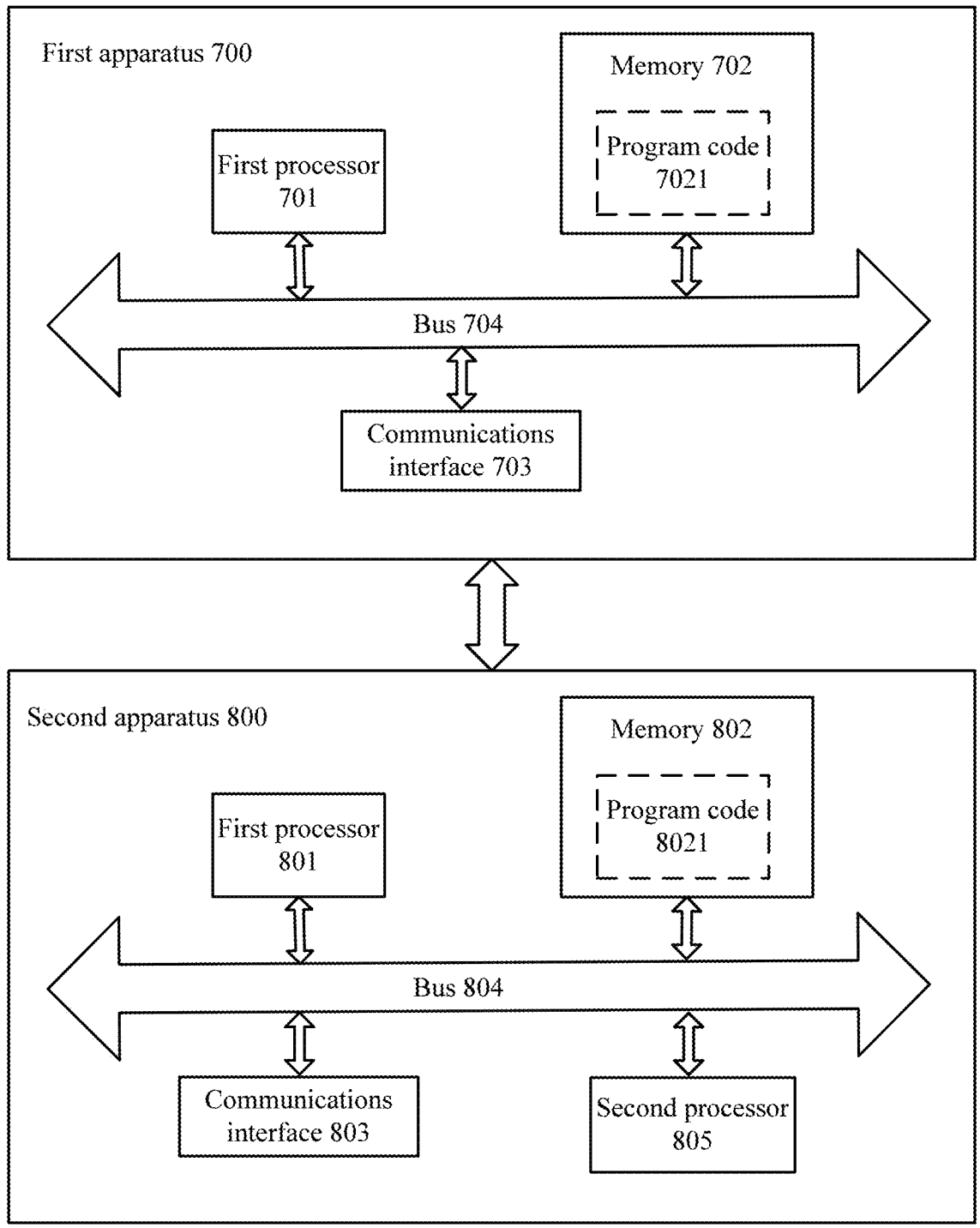
FIG. 7 is a schematic structural diagram of a heterogeneous apparatus system for data retrieval according to this disclosure.

FIG. 7 is a schematic diagram of a heterogeneous apparatus system according to an embodiment of this disclosure. As shown in the figure, the heterogeneous apparatus system includes a first apparatus 700 and a second apparatus 800. The first apparatus 700 and the second apparatus 800 communicate with each other by using a network, and the network includes Ethernet, an optical fiber network, and a wireless bandwidth (IB) network. The second apparatus 800 is configured to assist the first apparatus 700 in executing a data retrieval task. The first apparatus 700 includes a first processor 701, a memory 702, a communications interface 703, and a bus 704. The first processor 701, the memory 702, and the communications interface 703 communicate with each other by using the bus 704, or may communicate with each other in another manner such as wireless transmission. The memory 702 is configured to store program code 7021, and the first processor 701 is configured to invoke the program code 7021 stored in the memory 702, to schedule the second apparatus 800 to assist the first processor 701 in completing the data retrieval task. The second apparatus 800 includes a first processor 801, a memory 802, a communications interface 803, a bus 804, and a second processor 805. The first processor 801, the memory 802, the communications interface 803, and the second processor 805 communicate with each other by using the bus 804, or may communicate with each other in another manner such as wireless transmission. The first processor 801 in the second apparatus 800 is configured to: receive the data retrieval task of the first apparatus 700, and instruct the second processor 805 to retrieve data. A specific retrieval method is the same as the method shown in FIG. 2. For brevity, details are not described herein again. The second apparatus 800 may also be referred to as a heterogeneous apparatus.

It should be understood that in this embodiment of this disclosure, both the first processor 701 and the first processor 801 may be CPUs, or may be other general-purpose processors, DSPs, ASICs, FPGAs, or other programmable logic devices, discrete gate or transistor logic devices, discrete hardware components, or the like. The general-purpose processor may be a microprocessor, any conventional processor, or the like.

The second processor 805 may be a dedicated retrieval processor, for example, a GPU or an NPU, may be a CPU, or may be another general-purpose processor, a DSP, an ASIC, an FPGA, or another programmable logic device, a discrete gate or a transistor logic device, a discrete hardware component, or the like. The general-purpose processor may be a microprocessor, any conventional processor, or the like.

Optionally, when the second processor 805 is a GPU, the second apparatus further includes a video RAM (not shown in the figure).

It should be noted that the first processor 701, the first processor 801, and the second processor 805 in the heterogeneous apparatus system shown in FIG. 7 are merely examples. Quantities of first processors 701, first processors 801, and second processors 805 and a quantity of cores of each processor constitute no limitation on this embodiment of this disclosure.

Each of the memory 702 and the memory 802 may be a volatile memory or a nonvolatile memory, or may include both a volatile memory and a nonvolatile memory. The nonvolatile memory may be a ROM, a PROM, an EPROM, and EEPROM, or a flash memory. The volatile memory may be a RAM, and is used as an external cache. By way of example but not limitation, many forms of RAMs may be used, for example, an SRAM, a DRAM, an SDRAM, a DDR SDRAM, an ESDRAM, an SLDRAM, and a DR RAM.

The bus 704 and the bus 804 may include power buses, control buses, status signal buses, and the like in addition to data buses. However, for clear description, various types of buses are marked as the bus 704 or the bus 804 in the figure.

All or some of the foregoing embodiments may be implemented by using software, hardware, firmware, or any combination thereof. When software is used to implement the embodiments, all or some of the foregoing embodiments may be implemented in a form of a computer program product. The computer program product includes one or more computer instructions. When the computer program instructions are loaded and executed on a computer, all or some of the procedures or functions according to the embodiments of this disclosure are generated. The computer may be a general-purpose computer, a dedicated computer, a computer network, or another programmable apparatus. The computer instructions may be stored in a computer readable storage medium, or may be transmitted from a computer readable storage medium to another computer readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer readable storage medium may be any usable medium that can be accessed by a computer, or a data storage device, such as a server or a data center, integrating one or more usable media. The usable medium may be a magnetic medium (for example, a floppy disk, a hard disk, or a magnetic tape), an optical medium (for example, a digital versatile disc (DVD), or a semiconductor medium. The semiconductor medium may be a solid-state drive (SSD).

The foregoing descriptions are merely specific implementations, but are not intended to limit the protection scope of the present disclosure. Any variation or replacement readily figured out by a person skilled in the art within the technical scope disclosed shall fall within the protection scope of the present disclosure. Therefore, the protection scope of the present disclosure shall be subject to the protection scope of the claims.

What is claimed is:

1. A method comprising:
   determining a first retrieval range in first-type data of N pieces of data stored in a database;
   grouping the N pieces into M clusters, wherein $M \geq 2$, wherein each of the N pieces corresponds to one of the M clusters, wherein each of the M clusters has one central point, wherein each of the N pieces has a high similarity to a central point of a cluster to which each of the N pieces belong, and wherein cluster indexes uniquely identify the M clusters;
   retrieving to-be-retrieved data in the first retrieval range to obtain a first retrieval result, wherein data in the first retrieval range is a subset of the first-type data;
   retrieving the to-be-retrieved data from second-type data of the N pieces to obtain a second retrieval result, wherein the second-type data are at edge points of the M clusters; and
   determining a final retrieval result of the to-be-retrieved data from the first retrieval result and the second retrieval result.

2. The method of claim 1, wherein grouping the N pieces comprises grouping the N pieces into the M clusters according to a clustering algorithm.

3. The method of claim 1, further comprising dividing the first-type data into a plurality of layers according to a preset algorithm, wherein each of the layers comprises at least one piece of the first-type data and is uniquely identified by a layer index.

4. The method of claim 1, further comprising:
   selecting a comparison cluster from the M clusters;
   selecting z pieces of reference data from the N pieces, wherein $1 \leq z \leq N$; and
   performing the following data classification processing for each piece of reference data:
      obtaining to-be-classified data through retrieval from the database based on current reference data, wherein the to-be-classified data have a high similarity to the current reference data;
      determining whether the to-be-classified data belong to the comparison cluster;
      classifying the to-be-classified data as the first-type data when the classified data belong to the comparison cluster; and
      classifying the to-be-classified data as the second-type data when the classified data do not belong to the comparison cluster.

5. The method of claim 4, further comprising:
   calculating first similarities between the current reference data and the other N−1 pieces of data, performing sorting based on the first similarities to obtain m pieces of data sorted in descending order of similarities to the current reference data, and using the m pieces as the to-be-classified data, wherein $1 \leq m \leq N-1$; or
   calculating second similarities between the current reference data and central points of the M clusters, determining m clusters sorted in descending order of the second similarities, and using data in the m clusters as the to-be-classified data, wherein $1 \leq m \leq N-1$.

6. The method of claim 5, further comprising performing, after completing a round of data classification processing by using each of the z pieces of data as the current reference data, a next round of data classification processing by using each of the z pieces of data as reference data again, wherein a quantity of comparison clusters in a current round of data classification processing is greater than a quantity of comparison clusters in a previous round of data classification processing, wherein a comparison cluster in the previous round is a subset of comparison clusters in the current round, and wherein data processing ends when a quantity of comparison clusters reaches a preset maximum value.

7. The method of claim 1, further comprising:
presetting indication information of the first retrieval range, wherein the indication information indicates a cluster and a layer that are comprised in the first retrieval range; and
determining, based on the to-be-retrieved data and the indication information, a cluster index of the cluster comprised in the first retrieval range and a layer index of the layer comprised in the first retrieval range.

8. A data retrieval apparatus comprising:
a memory configured to store instructions; and
a processor coupled to the memory and configured to execute the instructions to:
determine a first retrieval range in first-type data of N pieces of data stored in a database;
group the N pieces into M clusters, wherein M≥2, wherein each of the N pieces corresponds to one of the M clusters, wherein each of the M clusters has one central point, wherein each of the N pieces has a high similarity to a central point of a cluster to which each of the N pieces belong, and wherein cluster indexes uniquely identify the M clusters;
retrieve to-be-retrieved data in the first retrieval range to obtain a first retrieval result, wherein data in the first retrieval range is a subset of the first-type data;
retrieve the to-be-retrieved data from second-type data of the N pieces to obtain a second retrieval result, wherein the second-type data are at edge points of the M clusters; and
determine a final retrieval result of the to-be-retrieved data from the first retrieval result and the second retrieval result.

9. The data retrieval apparatus of claim 8, wherein the processor is further configured to group the N pieces into the M clusters according to a clustering algorithm.

10. The data retrieval apparatus of claim 8, wherein the processor is further configured to divide the first-type data into a plurality of layers according to a preset algorithm, and wherein each of the layers comprises at least one piece of the first-type data and is uniquely identified by a layer index.

11. The data retrieval apparatus of claim 8, wherein the processor is further configured to:
select a comparison cluster from the M clusters;
select z pieces of reference data from the N pieces, wherein 1≤z≤N; and
perform the following data classification processing for each piece of reference data:
obtaining to-be-classified data through retrieval from the database based on current reference data, wherein the to-be-classified data have a high similarity to the current reference data;
determining whether the to-be-classified data belong to the comparison cluster;
classifying the to-be-classified data as the first-type data when the classified data belong to the comparison cluster; and
classifying the to-be-classified data as the second-type data when the classified data do not belong to the comparison cluster.

12. The data retrieval apparatus of claim 11, wherein the processor is further configured to:
calculate first similarities between the current reference data and the other N−1 pieces of data, perform sorting based on the first similarities to obtain m pieces of data sorted in descending order of similarities to the current reference data, and the m pieces as the to-be-classified data, wherein 1≤m≤N−1; or
calculate second similarities between the current reference data and central points of the M clusters, determine m clusters sorted in descending order of the second similarities, and use data in the m clusters as the to-be-classified data, wherein 1≤m≤N−1.

13. The data retrieval apparatus of claim 12, wherein the processor is further configured to perform, after completing a round of data classification processing by using each of the z pieces of data as the current reference data, a next round of data classification processing by using each of the z pieces of data as reference data again, wherein a quantity of comparison clusters in a current round of data classification processing is greater than a quantity of comparison clusters in a previous round of data classification processing, wherein a comparison cluster in the previous round is a subset of comparison clusters in the current round, and wherein data processing ends when a quantity of comparison clusters reaches a preset maximum value.

14. The data retrieval apparatus of claim 8, wherein the processor is further configured to:
preset indication information of the first retrieval range, wherein the indication information indicates a cluster and a layer that are comprised in the first retrieval range; and
determine, based on the to-be-retrieved data and the indication information, a cluster index of the cluster comprised in the first retrieval range and a layer index of the layer comprised in the first retrieval range.

15. A computer program product comprising instructions that are stored on a non-transitory computer-readable medium and that, when executed by a processor, cause a data retrieval apparatus to:
determine a first retrieval range in first-type data of N pieces of data stored in a database;
group the N pieces into M clusters, wherein M≥2, wherein each of the N pieces corresponds to one of the M clusters, wherein each of the M clusters has one central point, wherein each of the N pieces has a high similarity to a central point of a cluster to which each of the N pieces belong, and wherein cluster indexes uniquely identify the M clusters;
retrieve to-be-retrieved data in the first retrieval range to obtain a first retrieval result, wherein data in the first retrieval range is a subset of the first-type data;
retrieve the to-be-retrieved data from second-type data of the N pieces to obtain a second retrieval result, wherein the second-type data are at edge points of the M clusters; and
determine a final retrieval result of the to-be-retrieved data from the first retrieval result and the second retrieval result.

16. The computer program product of claim 15, wherein the instructions further cause the data retrieval apparatus to group the N pieces into the M clusters according to a clustering algorithm.

17. The computer program product of claim 15, wherein the instructions further cause the data retrieval apparatus to divide the first-type data into a plurality of layers according to a preset algorithm, and wherein each of the layers comprises at least one piece of the first-type data and is uniquely identified by a layer index.

18. The computer program product of claim 15, wherein the instructions further cause the data retrieval apparatus to:
select a comparison cluster from the M clusters;
select z pieces of reference data from the N pieces, wherein 1≤z≤N; and perform the following data classification processing for each piece of reference data:

obtaining to-be-classified data through retrieval from the database based on current reference data, wherein the to-be-classified data have a high similarity to the current reference data;

determining whether the to-be-classified data belong to the comparison cluster;

classifying the to-be-classified data as the first-type data when the classified data belong to the comparison cluster; and classifying the to-be-classified data as the second-type data when the classified data do not belong to the comparison cluster.

19. The computer program product of claim 18, wherein the instructions further cause the data retrieval apparatus to:

calculate first similarities between the current reference data and the other N−1 pieces of data, performing sorting based on the first similarities to obtain m pieces of data sorted in descending order of similarities to the current reference data, and using the m pieces as the to-be-classified data, wherein 1≤m≤N−1; or calculate second similarities between the current reference data and central points of the M clusters, determining m clusters sorted in descending order of the second similarities, and using data in the m clusters as the to-be-classified data, wherein 1≤m≤N−1.

20. The computer program product of claim 19, wherein the instructions further cause the data retrieval apparatus to perform, after completing a round of data classification processing by using each of the z pieces of data as the current reference data, a next round of data classification processing by using each of the z pieces of data as reference data again, wherein a quantity of comparison clusters in a current round of data classification processing is greater than a quantity of comparison clusters in a previous round of data classification processing, wherein a comparison cluster in the previous round is a subset of comparison clusters in the current round, and wherein data processing ends when a quantity of comparison clusters reaches a preset maximum value.

* * * * *